US009769368B1

(12) United States Patent
Morford et al.

(10) Patent No.: US 9,769,368 B1
(45) Date of Patent: Sep. 19, 2017

(54) REMOTE VIDEO SYSTEM

(71) Applicant: LooksyTV, Inc., Austin, TX (US)

(72) Inventors: David Morford, Round Rock, TX (US); Nicholas Thompson, RoundRock, TX (US); Nicolas Gonzales, Austin, TX (US); Miguel Vasquez, Del Valle, TX (US); Isaac Duran, Amarillo, TX (US); Aaron Darling, Austin, TX (US)

(73) Assignee: LOOKSYTV, INC., Austin, TX (US)

(*) Notice: Subject to any disclaimer, the term of this patent is extended or adjusted under 35 U.S.C. 154(b) by 0 days.

(21) Appl. No.: 14/497,311

(22) Filed: Sep. 25, 2014

Related U.S. Application Data

(60) Provisional application No. 61/882,424, filed on Sep. 25, 2013, provisional application No. 61/902,146, filed on Nov. 8, 2013.

(51) Int. Cl.
*H04N 5/232* (2006.01)
*H04N 5/225* (2006.01)

(52) U.S. Cl.
CPC ....... *H04N 5/23206* (2013.01); *H04N 5/2252* (2013.01); *H04N 5/2256* (2013.01); *H04N 5/23216* (2013.01)

(58) Field of Classification Search
CPC ........... H04N 21/4147; H04N 21/4223; G06K 9/00221–9/00328; G06T 2207/30196–2207/30201; G08B 13/19682; G08B 13/19602; G06F 3/0416; G06Q 30/0252; G06Q 30/0259; G06Q 30/02

USPC .......... 348/153, 157, 159, 154, 155, 207.11, 348/211.99, 211.1, 211.2, 211.3, 211.4, 348/211.8; 382/118; 715/733, 736
See application file for complete search history.

(56) References Cited

U.S. PATENT DOCUMENTS

| 6,122,409 | A | 9/2000 | Boggs et al. |
| 6,556,241 | B1 * | 4/2003 | Yoshimura ......... H04N 5/23206 348/143 |
| 8,176,144 | B2 | 5/2012 | McIntyre |
| 8,737,688 | B2 | 5/2014 | Murphy |
| 2003/0151690 | A1 * | 8/2003 | Tecu .................... H04N 5/2354 348/370 |

(Continued)

*Primary Examiner* — Xi Wang
(74) *Attorney, Agent, or Firm* — Cesari & Reed, LLP; Kirk A. Cesari

(57) ABSTRACT

Systems and methods are disclosed for a remote video system. In some embodiments, a camera device may include a processor configured to capture image and audio content, perform data manipulation to alter the content, and stream the content to a remote server. Camera devices may be set up at a particular venue or location, and may have settings selected by a venue administrator. Camera devices may also be configured for head recognition, for determining activity levels in a venue, and for reporting accumulated data to the remote server. Streamed content may be accessed by users over a network via an application on computing devices, such as mobile applications or web browsers. The application may provide promotional materials to users based on the user's location, the activity levels within the venue, or other information. Users may also be able to establish direct stream connections to customer service or other venue personnel.

17 Claims, 14 Drawing Sheets

(56) References Cited

U.S. PATENT DOCUMENTS

| | | | |
|---|---|---|---|
| 2004/0119814 A1* | 6/2004 | Clisham | H04N 7/141 348/14.08 |
| 2006/0242679 A1* | 10/2006 | Hutchison | H04N 7/173 725/105 |
| 2007/0025711 A1* | 2/2007 | Marcus | G03B 17/38 396/56 |
| 2009/0207269 A1* | 8/2009 | Yoda | G06T 11/60 348/222.1 |
| 2009/0249212 A1* | 10/2009 | Sorensen | G06F 17/3028 715/733 |
| 2009/0268032 A1* | 10/2009 | Jones | H04N 7/183 348/164 |
| 2009/0293083 A1* | 11/2009 | Gordon | H04N 7/162 725/25 |
| 2009/0316007 A1* | 12/2009 | Ito | H04N 5/77 348/207.11 |
| 2011/0032570 A1* | 2/2011 | Imaizumi | H04N 1/387 358/1.15 |
| 2011/0234838 A1* | 9/2011 | Naganuma | G06T 13/80 348/222.1 |
| 2012/0147169 A1* | 6/2012 | Harper | G06Q 30/0204 348/77 |
| 2012/0150586 A1* | 6/2012 | Harper | G06Q 30/0204 705/7.33 |
| 2012/0207356 A1 | 8/2012 | Murphy | |
| 2012/0221741 A1* | 8/2012 | Frojdh | H04N 21/2343 709/231 |
| 2012/0327225 A1* | 12/2012 | Barley | H04N 7/188 348/143 |
| 2013/0073383 A1* | 3/2013 | Uyeki | G06Q 30/0269 705/14.49 |
| 2013/0076918 A1* | 3/2013 | Park | H04N 1/00251 348/207.11 |
| 2013/0093897 A1* | 4/2013 | Fan | H04N 7/181 348/159 |
| 2013/0194431 A1* | 8/2013 | O'Connor | H04N 21/21805 348/159 |
| 2014/0063240 A1 | 3/2014 | Matthews et al. | |

\* cited by examiner

REMOTE VIDEO SYSTEM

CROSS REFERENCE TO RELATED APPLICATIONS

The present application is a non-provisional application of and claims priority to U.S. provisional patent application Ser. No. 61/902,146, filed Nov. 8, 2013, entitled "Video System Looksy TV," as well as to U.S. provisional patent application Ser. No. 61/882,424, filed Sep. 25, 2013, entitled "Video System," the contents of which are hereby incorporated by reference in their entirety.

SUMMARY

In certain embodiments, a device may comprise a processor configured to be coupled to a camera and a network interface, the processor configured to receive image data from the camera, graphically modify the image data, and push the modified image data to a remote server via the network interface without receiving a request from the server for the modified image data.

In certain embodiments, an apparatus may comprise a network interface, a processor coupled to the network interface and configured to maintain camera settings for operation of a remote camera device, receive, via the network interface, image data pushed from the remote camera device, and provide the image data to remote viewing devices via the network interface.

In certain embodiments, a device may comprise a graphical user interface, a network interface, a processor configured to request, via the network interface, image data from a remote camera device at a specified location based on a user selection, and display the image data on the graphical user interface.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that when executed cause a processor to perform the methods.

Figure 1:
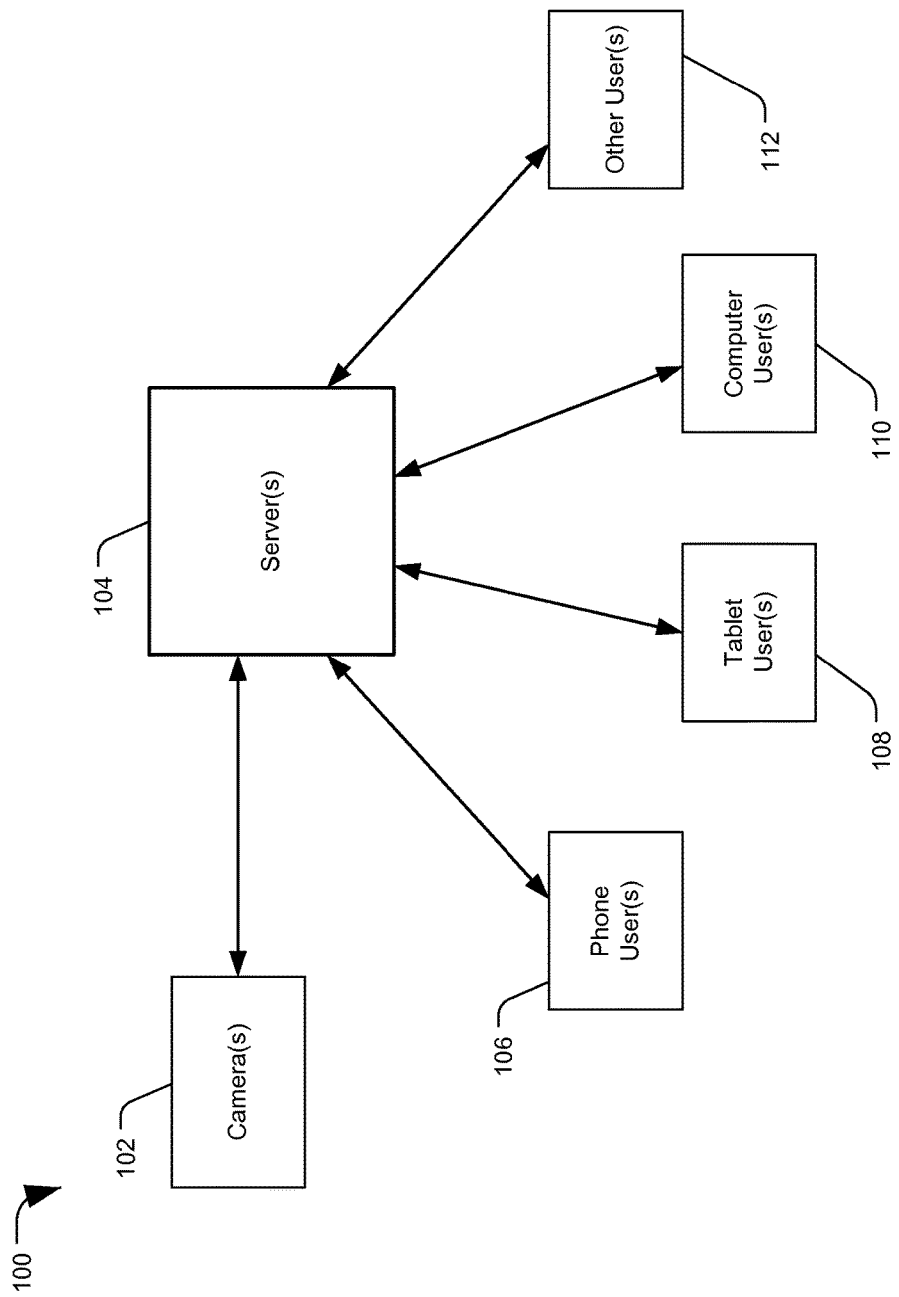
FIG. 1 depicts an example embodiment of a remote video system, in accordance with certain embodiments of the present disclosure.

FIG. 1 depicts an example embodiment of a remote video system 100, in accordance with certain embodiments of the present disclosure. System 100 may include a camera device 102. The camera device 102 may include a camera or video capture input, an audio input, and a processor configured to implement video and audio capture, video or audio manipulation, and data transmission. In some embodiments, the camera 102 may include one or more circuit boards, processors, data storage devices, or other computing systems in addition to video capturing and transmission components. The camera device 102 may include an installed camera at a location, or a camera incorporated into a mobile device such as a smart phone or tablet.

The camera 102 may connect to one or more servers 104, for example over a network interface. In some embodiments, camera 102 may be capable of streaming video content to a server 104 over a remote connection, such as an internet connection. The one or more servers 104 may include a computing device storing instructions for data receipt, storage, and transmission. The one or more servers 104 may include a local network server, an administrative sever or other server to store and manage settings information or accounts, a media server, other servers, or any combination thereof, as described herein. The servers 104 can be separate devices or a single device. In some embodiments, the functions of each server 104 can be distributed across several computing devices.

Data captured by the camera 102 and transmitted to the server 104 may be accessed using a variety of devices. For example, video streams, audio streams, or other data from the camera 104 may be accessed by users with a phone device 106, a tablet device 108, a computer device 110 such as a desktop or laptop computer, or other devices 112.

In an example embodiment, a camera device 102 may be installed or placed at a venue such as a restaurant, a dance club, or an event, or camera 102 may be installed or placed within a school bus, a home, an office, or any other location or venue. The camera 102 may capture data, such as a video stream, a sequence of images, sound, or other data, and transmit the data to a remote server 104. The captured video, audio, or other input data may be accessed from the server by remote users, such as users 106 through 112. For example, users may be able to download an application to their computers, mobile devices, or other devices which can access the video content on or through the servers for playback on the devices. In some embodiments, a user may be able to access a website to view content streams. For example, the content may be accessed through a dedicated website of the camera distributor, a website associated with the venue, or through social media sites.

Users may be able to view the captured content to determine what events are occurring at a venue, how busy it is, what the interior looks like, or similar information. In some embodiments, the camera 102, the user application, server 104 settings, or any combination thereof, may be configured to provide a limited duration stream, such as for four seconds, to users. A user may then need to wait some duration to view a stream from the same venue again; e.g. ten minutes. For example, server 104 may be configured to provide image data from a camera 102 to a selected remote viewing device for a specified time limit (e.g. five seconds), intentionally disable access of the selected remote viewing device to the image data for a specified time-out period following the specified time limit (e.g. three minutes), and then re-enable access of the selected remote viewing device to the image data after the specified time-out period has elapsed.

In some embodiments, users may be able to remotely adjust the view or zoom of the camera device 102. Users may be able to access live video streams in real time or near-real time, or they may be able to access recorded footage and fast forward, pause, or otherwise manipulate the playback. In some embodiments, users may be able to "take a photo" with the camera 102 via the user interface of the mobile application, web browser, or similar application. For example, a user at a venue may be able to pose for a photo in front of the camera, and use a mobile phone to tell the camera 102 to take a "snap shot." The photo of the user may then be stored to the user's mobile phone via the application, received via email or text message, posted to a social media site, or received or stored in another way.

In some embodiments, a user's mobile device with image, video, or audio capturing capability may function as the camera 102. The user may access a remote server 104, for example using a web browser application or a dedicated application, to stream or transmit the captured content. Other users, for example a specific target recipient, may be able to access the content via the server 104.

In an example embodiment, a camera 102 may be employed in an ambulance or similar emergency vehicle. The camera 102 may be an installed dedicated camera, or it may be a mobile device of emergency personnel of the ambulance. Using the camera 102, a video stream of an injured individual may be transmitted to a server 104 and accessed from a local hospital. A paramedic could also input information such as vital signs or injuries via a user interface of a mobile device application, which information could be transmitted to server 104 and accessed from a local hospital. This information can be monitored by emergency room personnel at the hospital to prepare the hospital for the condition or injuries of a patient before the patient arrives.

In an example embodiment, a user may have an application stored on a portable device, such as a mobile phone. By contacting emergency services, such as by dialing 911, the application may cause a camera 102 on the portable device to begin capturing and streaming video or audio content, which stream can then be accessed by emergency services personnel to determine details of the caller's situation, to capture images of a crime or perpetrator, or to transmit other information. In another example embodiment, a user may employ their camera device 102 to capture the scene of an accident or other crime, to capture damage to public property, or similar data. This information can then be transmitted and accessed by law enforcement, municipal maintenance personnel, or similar authorities.

In an embodiment, a camera 102 may be installed in a user's home. The user may then be able to access the view from the camera 102 remotely, for example by logging in to a specific account through a website or mobile application.

In an example, a venue or other location can broadcast specific programming using an installed camera 102 to users of the remote camera system. For example, a grocery store could use the system to broadcast a cooking program, which may be viewed by remote users.

In some embodiments, users may use the devices, such as mobile phone 106, table 108, etc., along with an application or web browser interface to access data content. Users may also be able to use their devices to interact with camera 102 or camera settings. For example, a venue administrator may be able to use a device to adjust camera settings for their venue, which settings may be stored at the server 104 and propagated to the camera 102. In some embodiments, users can adjust a zoom of a camera 102, or take pictures with camera 102 based on input to their user device. In some embodiments, user devices may also be able to function as cameras to capture video or audio data, which can be transmitted to the server 104 and accessed by other users.

A venue or other location may be able to use the remote camera system to interact with customers or potential customers. For example, a camera 102 may be positioned at a customer service station of a store along with a computer or other receiving unit. A customer at the store may use an application on their mobile device to contact the customer service station and have a video or audio conference with customer service personnel. The customer may be able to obtain information such as where to find a product, or whether an item is in stock, without the need to physically locate an employee within the store.

The camera device 102 may be capable of image processing and manipulation. In some embodiments, the camera 102 device may be configured to count a number of people or heads in the camera's view, for example by using object recognition and head detection algorithms. The camera 102 may be able to broadcast the head count or keep a log of head counts. For example, it could record head counts at different times, an all-time high, or calculate an average over a time period. In addition, the camera 102 device may be able to monitor or broadcast additional information, such as activity (e.g. movement, change of pixels), sound levels, or other information. The camera device 102 may be configured to recognize faces and make estimates on gender, age, or other information. Accumulated and calculated analytics data may be made available to a venue owner via an administrative analytics panel that may have graphical representations of data. In some embodiments, the camera 102 may be configured to apply filters to streamed images.

In an example embodiment, a venue administrator or other location may set personal preferences for the stream transmitted from the venue. For example, the venue administrator may be able to configure what type of image processing is performed on the images, such as non-graphical processing settings including a length of time or time periods when streams are transmitted, or other settings. Venue administrators may also be able to set graphical image processing selections, such as to hide user identities with blurring or "cartoonizing" images or people, or by adding other graphical touches to give streams from their venue more character such as inserting smiley faces or hats over patrons' heads. For example, cartoonizing may include using object recognition software to outline objects, and applying a cell-shading filter to give broadcast images the impression of being a cartoon. Other cartoonizing implementations are also possible. Other graphical touches may include recognizing one or more whole humans or parts of humans, such as head recognition, and adding blurring, hats, masks, or similar graphical touches. In some embodiments, cartoon smiley faces may be superimposed over the heads of customers. In some embodiments, the camera may be configured to recognize obscene material, such as obscene gestures or nudity, and apply blurring to obscure the obscene material. Graphical overlays or filters may also be applied, such as falling confetti, a sepia tone filter, or other effects. Other embodiments are also possible.

In some embodiments, the camera devices 102 configured to apply graphical filters or modifications may only transmit modified image data, and not transmit the raw image or video footage. For example, this may prevent customer identities from being determined if the image data is intercepted during transmission. In some embodiments, the camera device 102 may not store raw or unedited image data after performing modifications. Other embodiments are also possible.

In an embodiment, a venue administrator could opt to transmit coupons, advertisements, or other promotions to nearby users 106-112 when images captured by the camera 102 indicate that the number of customers or activity levels in the venue are below a threshold. For example, user applications may determine the location of a user (e.g. using global positioning system "GPS" functionality), and the location may be compared to the location of a venue having a camera device 102. In some embodiments, there may be multiple promotions tied to multiple activity thresholds; e.g., better coupons may be sent to customers for lower activity levels in the venue. Venue owners could use analytics data to monitor marketing campaigns in order to see if the campaigns are successfully driving in foot traffic, for example. After collecting data, a venue owner could use this data to predict foot traffic and trends or patterns.

The remote video system may be configured to provide different levels of service to users. For example, the system may support both free user accounts and paid user accounts. Free users may be able to access a limited number video streams, access video streams for limited time periods, may have advertisements inserted into the video streams, or other constraints. A user with a paid version of an application may have no ads, longer viewing periods, shorter waits between video stream snippets from a venue, additional camera control options, or other features.

Figure 2:
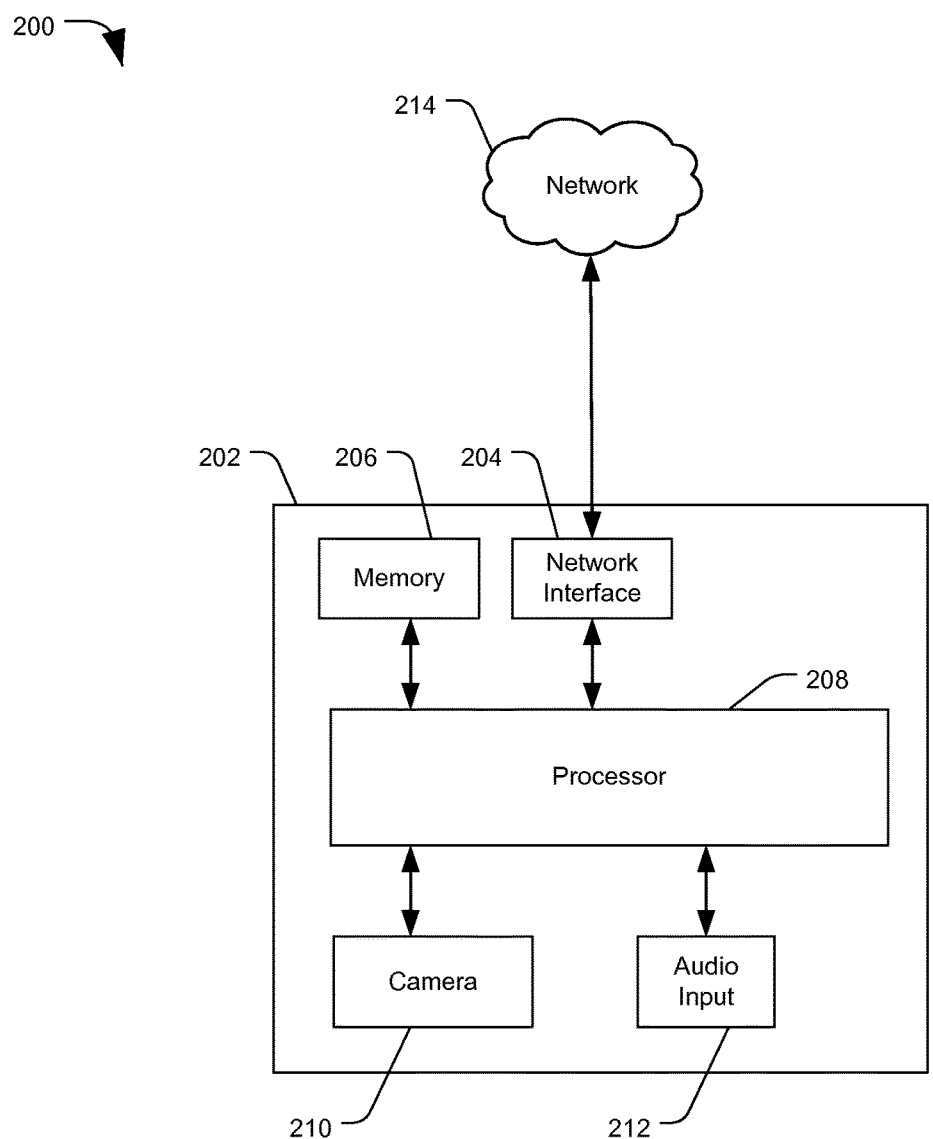
FIG. 2 depicts an example embodiment of a remote video system, in accordance with certain embodiments of the present disclosure.

FIG. 2 depicts an example embodiment of a remote video system 200, in accordance with certain embodiments of the present disclosure. In particular, FIG. 2 depicts an example embodiment of a camera device 202, such as the camera 102 as described herein with reference to FIG. 1. In some embodiments, camera device 202 is a self-contained video camera or surveillance camera. For example, the surveillance camera can include mounting hardware to allow the camera device 202 to be installed on a ceiling, wall, or similar structure. In some embodiments, a surveillance camera may be connected to a surveillance system including a remote server or computer. The camera device 202 may include a network interface 204 via which the camera 202 can exchange data over a network 214. The network interface 204 may be connected to a processor 208 for performing computations and functions described for camera devices herein. For example, processor 208 may control basic functionality of camera device 202, such as image and audio capture, processing, storage, or transmission. Processor 208 may retrieve information from a server over network 214 regarding hours for image capturing, image or audio manipulation or overlay options to apply, or other settings. The processor 208 may receive commands over network 214 to take a "snapshot", zoom in or out, adjust a camera view, or other options. Other embodiments are also possible.

The camera device 202 may further include a camera element 210 and an audio input 212, such as a microphone. The camera 202 may include one or more volatile or nonvolatile memories 206, which may store data captured by the camera 210 or audio input 212, received over the interface 204, or it may store instructions executable by the processor 208 to perform functions described for a camera device herein.

Data captured using the camera 210 or audio input 212 can be modified at the processor 208, encoded into a proper transmission format, and broadcast over a network 214, such as to a server device. In some embodiments, data may be sent from the camera device 202 directly to end user devices. For example, processor 208 may graphically modify image data captured through camera 210 based on image modification settings, such as by applying blurring or other graphical effects. In some embodiments, processor 208 may transmit the modified image data via network interface 204, and may not store or transmit raw or unmodified image data. In some embodiments, the camera device 202 can receive data over the network 214, such as settings for when to operate or how to manipulate image data, software updates, or other information.

Figure 3:
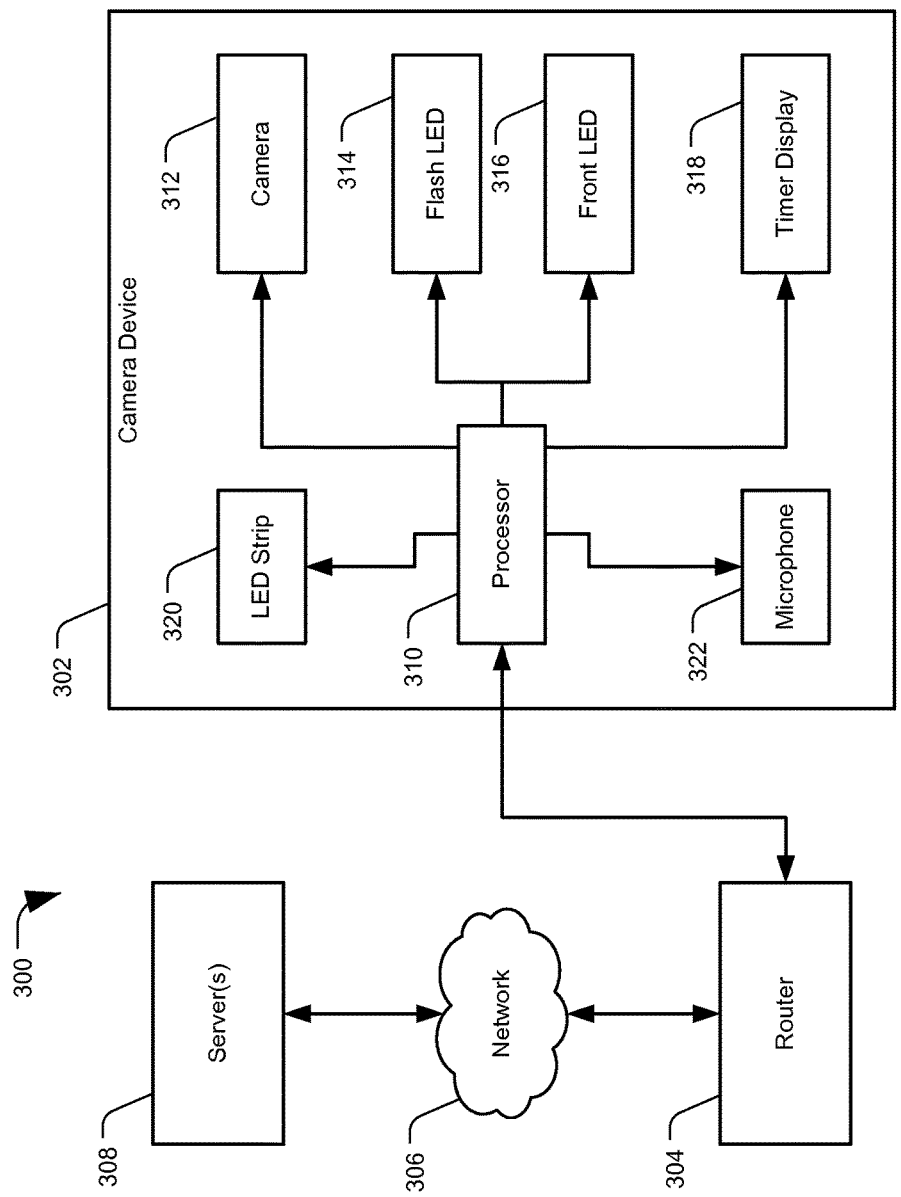
FIG. 3 depicts an example embodiment of a remote video system, in accordance with certain embodiments of the present disclosure.

Turning to FIG. 3, an example embodiment of a remote video system 300 is depicted, in accordance with certain embodiments of the present disclosure. System 300 may include a camera device 302, which may perform the functions of camera devices disclosed herein. Camera device 302 may send and receive data through a router 304. Camera device 302 may send and receive data from the router 304 over wired or wireless connection, for example using a network interface (not shown). In some embodiments, router 304 may be incorporated into camera device 302.

Router 304 may be connected to a network 306, such as an internet or a local area network (LAN). Camera device 302 may access one or more servers 308 over network 306. For example, image or audio data captured by camera device 302 may be transmitted to a media server for storage or streaming to user devices. In some embodiments, camera device 302 may obtain or receive commands, settings, firmware updates, or other information from servers 308.

Camera device 302 may include a camera element 312 (for example, including a lens assembly, light sensors, etc.) to capture image or video data, and a microphone 322 to capture audio data. A processor 310 may be configured to control operations of components of the camera device 302, or to receive data from the components, from servers 308, or from other sources. For example, processor 310 may control a flash light emitting diode (LED) 314 on camera device 302. For example, flash LED 314 may provide lighting for taking a snapshot using camera element 312, such as based on a command submitted through a user device. Camera system 302 may also include a front LED 316, which may be illuminated when the camera device 302 is capturing image or audio data. Camera device 302 may also include a timer display 318. For example, timer display 318 may be a digital time display which may show a countdown until a snapshot is taken, allowing individuals to pose and get ready. In some embodiments, processor 310 may also control and LED light strip 320. For example, LED light strip 320 may be used to create a light "halo" behind the camera, to help customers locate the camera 302. In some embodiments, processor 310 may control one or more LED light strips 320 to change colors or pulse, for example based on music playing at the venue of the camera device 302.

Figure 4:
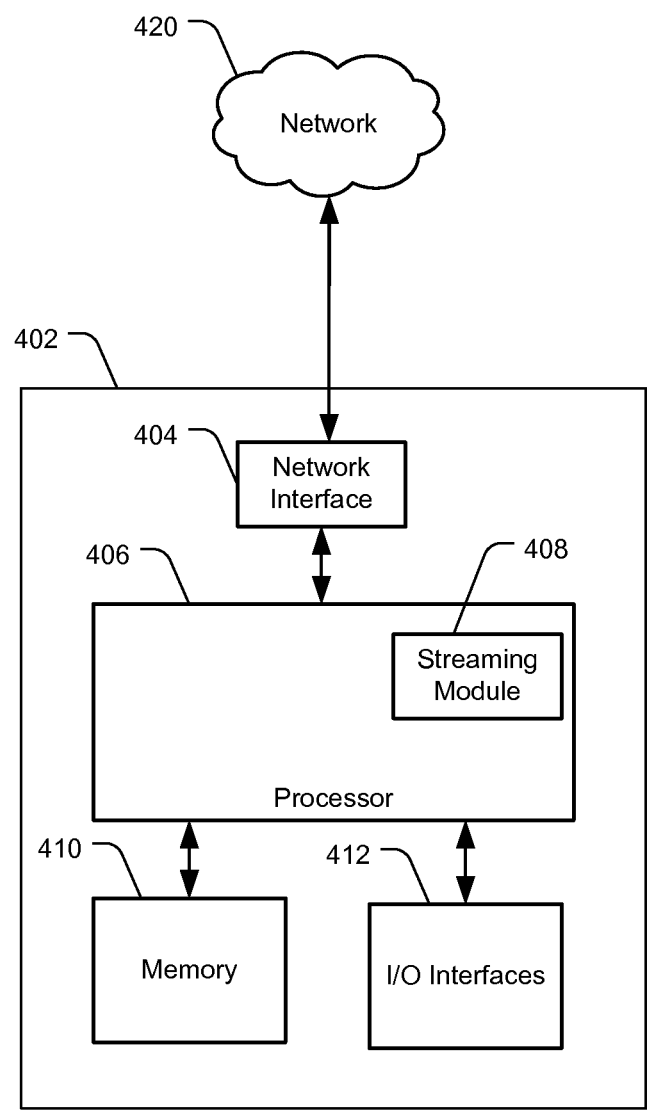
FIG. 4 depicts an example embodiment of a remote video system, in accordance with certain embodiments of the present disclosure.

FIG. 4 depicts an example embodiment of a remote video system 400, in accordance with certain embodiments of the present disclosure. System 400 may include a computing device 402 connected to a network 420. Computing device 402 may be a server as described herein in relation to FIG. 1 or FIG. 3, such as a local network server, an administrative server, a media server, other servers, or any combination thereof. The computing device 402 may also represent a user device which can be used to access data from the video system, such as a mobile phone, tablet, computer, set top box, or other device. The computing device 402 may include a network interface 404 which allows the computing device 402 to send and receive data over network 420. For example, a server may receive streamed video content from a camera device over network 420, and transmit data to user devices over the network 420.

The computing device 402 may further include a processor 406, which may include a streaming module 408. The processor 406 may be configured to perform computations and manipulation on data, such as verifying camera devices, authenticating users, performing head counting and other processing operations on data streams, or other functions. In some embodiments, the streaming module 408 may handle receipt or broadcasting of data streams, such as video or audio streams received from camera devices. The computing device 402 may also include one or more volatile or non-volatile memories 410, such as to store user data or settings, video or audio content, computer-executable instructions to perform methods and processes described herein, any other data, or any combination thereof. The computing device 402 may also include one or more input output (I/O) interfaces 412, such as to display video content or play audio content on a screen or speakers, or to receive input through a mouse, keyboard, or touchscreen.

Figure 5:
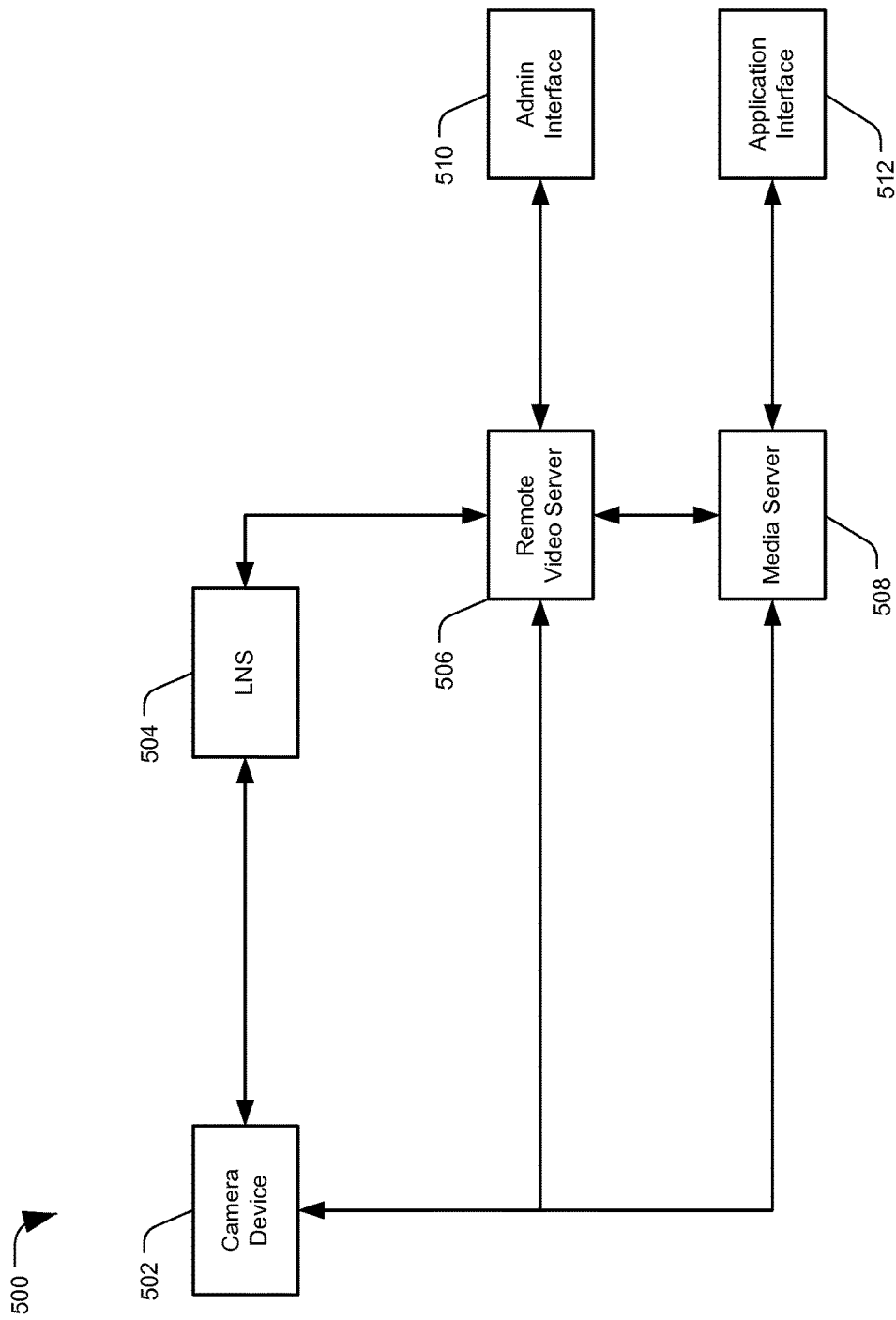
FIG. 5 depicts an example embodiment of a remote video system, in accordance with certain embodiments of the present disclosure.

FIG. 5 depicts an example embodiment of a remote video system 500, in accordance with certain embodiments of the present disclosure. System 500 may include a camera device 502, which may include an element for capturing image or video data such as a camera, and a processor or circuit board assembly for controlling operations of camera device 502. As used herein, "camera device" 502 may refer to the camera element, the processor or circuit board assembly, or a device comprising a combination of camera and processor elements. System 500 may also include a local network server 504, a remote video server 506, sometimes called an administrative server, and a media server 508. In some embodiments, venue administrators or other entities having a camera device 502 may be able to adjust camera operation settings, obtain data about data captured through the camera device 502, or otherwise interact with the remote camera system through an administrative interface 510. End users may access video or audio streams or images, or control some camera functions through an application interface 512.

A camera device 502 or associated processor or control board may be registered to a remote video system, such as by adding the camera 502 to a database of devices on remote video server 506, Local Network Server (LNS) 504, or another database. For example, LNS 504 may be one or more internal on-site servers of a company operating the remote video system, and may be used to load initial firmware, updates, or settings for camera devices 502, and to pre-register camera devices 502 before they are installed at a venue, school bus, etc. In some embodiments, a camera device 502 may be preregistered with LNS 504 during a manufacturing process for the camera device 502. In some embodiments, camera device 502 may be capable of remote connection to an LNS 504, and may register remotely.

As described, LNS 504 may register and verify camera devices 502. All camera device 502 registers may be tied to a unique user or venue to keep track of who is registering camera devices and ensure third-parties are unable to register a camera on the remote video system. Username/password login may be required. For example, a camera device installer may have an application on a mobile device for setting up a camera device 502. The installer may need to enter a username and password to authenticate the registration. In some embodiments, the board may be configured to log in automatically using a pre-registered username and password stored on the device.

At a power-on event, the camera device 502 may initialize itself with logs and configuration files. The camera device 502 may attempt a first post to LNS 504. The camera 502 may retry posting if it can't reach LNS 504. After reaching the LNS 504, the camera device 502 may send globally unique identifier (GUID) or media access control (MAC) ID information for the camera device 502. For example, the GUID and MAC for each camera device 502 may be used as a username and password that authenticate the device 502 through SSL (secure sockets layer), TLS (transport layer security), or similar communication security protocols.

The remote video server 506 may maintain information on venues and settings for camera devices 502, and may control camera device operations. The remote video server 506 may pull all board or venue settings from an admin database (e.g. a user facing admin panel 510 may allow for administrators and venue owners to set board or venue settings). The remote server 506 can manage all camera device 502 settings and statuses. The remote server 506 may also be able to restart and update all camera devices, manage stored videos, start and stop the media server (MS) 508, reboot the MS 508, among other functions, all from a secure (e.g. using HTTPS) Administrator Panel or Dashboard 510.

The LNS 504 can log into the remote video server 506 securely (e.g. over HTTPS) and register the new camera device 502 by adding it to a database, for example with default settings. All posts may be verified, for example with a unique CSRF (Cross-site Request Forgery) token, which can be used to authenticate the posting device. The remote video server 506 can assign video ports, audio ports, or both on MS (Media Server) 508 to the new board. Remote video server 506 can create an SDP file (Session Description Protocol, for describing streaming media initialization parameters) for MS 508. An SDP file may be a set of properties and parameters, often called a "session profile," for a media stream from camera device 502. Camera device 502 may check for new default settings or code updates. The camera device 502 may flag itself as 'registered'.

The registration process described herein may be performed prior to installing camera device 502 at a desired location (e.g., during a device manufacturing process), during installation, or at another point. For example, if a camera device 502 is preregistered, installation may include only connecting the device to a network interface and powering on the device 502. The camera device 502 may then be able to access the remote video server 506, media server 508, or other necessary system components to start streaming automatically. An installer may not need to set up a GUID etc. for the camera device 502 on site. Other embodiments are also possible.

Operation of a registered camera device 502 may proceed as described herein. Before or after registration, camera device 502 may be associated with a particular venue, which may be stored in a database along with venue-specific settings at remote video server 506. For example, a camera may be associated with a venue account, including venue name, address, geographical location (e.g. latitude and longitude), and settings selected by a venue administrator. Camera device 502 may be configured with automatic push communication to access servers such as the remote video server 506, in a beehive-like system. An automatic push configuration may allow camera device 502 to be located behind a firewall and still communicate with servers, without forwarding the camera device's IP to the server. Settings and other information can be obtained from servers in this manner. Other configurations are also possible.

Camera device 502 can check venue hours for the particular venue, such as streaming start and stop times, for example by consulting information stored at the remote video server 506. For example, a camera device 502 may be configured to only capture image data and stream image data during a venue's hours of operation. If within venue hours, camera device 502 can start a video pipeline thread (e.g. using streaming or pipeline-based media frameworks, such as GStreamer) and may constantly post to MS 508, e.g. over UDP (User Datagram Protocol). Camera device 502 may start posting to the remote video server 506 (e.g. over HTTPS) to check for settings or software updates. For example, post frequency may be determined in default settings of camera device 502. The remote video server 506 may respond with commands, e.g. a JSON (JavaScript Object Notation) object containing commands for camera device 502 to execute immediately. For example, commands may include: update (e.g., updating using a distributed revision control software such as Git), request (e.g. camera device 502 reports status and settings of the camera device to the remote video server 506), restart, delete (e.g. delete files), among other commands. Camera device 502 may also set video settings on the video pipeline, such as resolution, frames per second (fps), filters, video flips, bit rate, other settings, or any combination thereof.

The camera device 502 registration process, including preregistering with LNS 504, avoids the need for a manual process in which the camera is configured with specific network settings on the router. Some internet protocol cameras host the video stream either on a microcontroller that may support few users, or on a local computer, laptop, server, or similar device. The connection between the camera device 502 and the remote video server 506 avoids those shortcomings. Accordingly, the remote camera system 500 described herein may require no custom network settings and can handle an infinite number of concurrent users viewing a stream. The camera device 502 may simply be connected to a network and configured to automatically connect and setup to the remote video server 506; the camera 502 does not need to be connected to a computer and manually configured. Camera device 502 can be IP address independent; e.g. the camera may not require a venue to have a dedicated IP address, may not require a DNS (domain name system) server to keep track of venue IP addresses, and has no need for configuration at a router.

As described herein, Media Server (MS) 508 can control receipt and distribution of media. The MS 508 can be used to deliver live video and audio streams to any number of devices, over any protocol, simultaneously, from a single set of source live streams received from camera devices 502. The MS 508 may be configured to transform one source video format to adaptive bitrate streams for any screen, and may be used with, e.g. Flash®, HLS (HTTP Live Streaming), or Silverlight®. The MS 508 may be configured to work with a number of different encoders. In some embodiments, camera device 502 can send a video feed to the MS 508 without the need for encoders. The MS 508 can broadcast the stream to users on computers, mobile devices, set-top boxes, or other viewing devices, for example through an application interface 512.

The MS 508 may be configured to deliver a time-shifted viewing experience that enables viewers to pause, rewind or resume live streams on user devices, such as by using controls of the application interface 512. The MS 508 may be configured to record a live stream to a file, and make the stream available for later playback.

The MS 508 may be configured to implement security measures. For example, the MS 508 may support encrypted video streams, such as using Flash RTMP (Real Time Message Protocol) and HLS AES-128 (Advanced Encryption Standard) protection. The MS 508 may incorporate closed captioning into the preparation and delivery of video content. The MS 508 may support multi-track audio channel selection capabilities, such as to support multiple languages. The MS 508 may also support different broadcasts for on-demand or free content, or insertion of advertising into streams.

In some embodiments, the MS 508 may also receive and support recorded content from distributed viewing users. For example, users may record audio or video which may be viewable from an administrator application accessible by a venue manager. The MS 508 may also be configured to support live video or text chat applications, such as to support live interaction between distributed viewing users of the video system and retailers or property management of locations supporting the video system.

While system 500 includes three servers, it should be understood that more or fewer servers or computing elements may be included without departing from the scope of the present disclosure. For example, the functions of LNS 504, remote video server 506, and media server 508 may be integrated into a single system, or distributed across four or more processing systems. Other embodiments are also possible.

In some embodiments, the camera device 502 may have software or plugins, such as Gstreamer, a python script with the Open Source Computer Vision (OpenCV) library, to enable real-time or near real-time image processing at the camera device 502 itself, and pipe processed data to the MS

508. For example, the camera device 502 may have a plugin that counts heads in the frame, and posts this number to the remote video server 506 over e.g. HTTPS. Venue administrators may be able to use the head counts to determine peak occupancy times, for example. The camera device 502 can also determine and send measured activity levels, for example based on a number of pixels changing between image frames, sound levels, or other measured inputs. The camera device 502, the remote video server 506, or the media server 508 may perform additional image processing on a received stream, such as facial recognition or age or gender determination. The remote video server 506 can record historic headcount data for each venue in a database.

Venue administrators may be able to configure their video stream applications, web pages, or other portals to push coupons and specials to users. For example, venue administrators can set different coupons or specials to trigger or be pushed to users based on a percentage of a designated total volume or capacity of the venue (e.g. at 60% volume offer coupon A, at 40% volume offer coupon B, etc.). In some embodiments, remote video server 506, media server 508, or both may monitor default promotions settings or those selected by a venue administrator, and implement advertising and promotional materials. For example, camera device 502 may calculate an activity level at a venue based on an amount of changing pixels or detected persons. The remote video server 506 may use the activity level information to determine whether to display advertisements on users' application interfaces 512, such as by promoting a restaurant if the activity levels falls below a threshold. Remote video server 506, media server 508, or both may also store locational information of venues associated with camera devices 502, and may receive locational information from user devices. Promotions or advertisements may be provided at the application interfaces 512 based on a user's proximity to a venue with a camera device 502. In some embodiments, the application interface 512 may include map and directions functionality, or may interface with an application including map and directions functionality. Accordingly, the application interface 512 may provide directions to a venue having a camera device 502 based on a user's current location. For example, remote video server 506 may provide a promotional coupon to a user for a nearby venue. The user may be able to press a button on the application interface 512 to be directed to the venue. The Application interface 512 may automatically populate "starting location" and "destination" fields of a navigational application to direct the user to the venue. Other embodiments are also possible.

Camera device 502 may also be configured to modify or add elements to video or audio streams. For example, the camera device 502 may be configured to detect and add a blurring filter over customer heads or faces. In some embodiments, graphical images may be inserted over customer heads, such as "smiley face" emoticons, balloons, halos, horns, or other graphical filters to obscure or modify details of a video steam. In an embodiment, a "cartoonization" filter may be applied, which modifies at least a part of the image data in a stream to make the image or objects within the image appear to be a drawn image or cartoon. This can be used either to add character or to hide customer identities. In some embodiments, venue owners can select which filters to apply using an admin interface 510 for their camera, such as on a computer, mobile device, tablet, or other device.

Accordingly, the remote video system 500 allows for real time or near-real time image processing and advertising opportunities. By performing image processing at the camera device 502, the processing burden on the remote video server 506 or media server 508 may be kept low.

Figure 6:
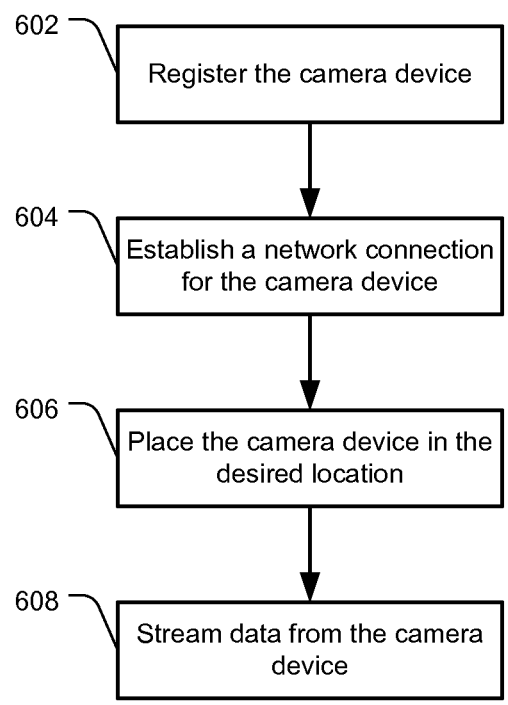
FIG. 6 is a flowchart of a method for a remote video system, in accordance with certain embodiments of the present disclosure.

FIG. 6 is a flowchart of a method 600 for a remote video system, in accordance with certain embodiments of the present disclosure. Method 600 may include registering a camera device, at 602. For example, registration may include interfacing a camera device with a server system, as described in relation to FIG. 5. In some embodiments, a circuit board of the camera device may be connected to a local network server for initial or pre-registration, for example by using an Ethernet cable.

In some embodiments, a camera device may provide a unique GUID, MAC address, other identifier, or any combination thereof, to a server system, and be entered into a database or list of valid camera devices. The camera device may be connected to the server locally or remotely, through a wired or wireless connection. In some embodiments, an installer may manually enter identifiers for the camera device, such as by typing in ID information into an installer application on a computing device, scanning a quick response (QR) code printed on the camera device or packaging therefor, or through another method. Registration may also include associating the camera device with a specified venue, administrator, or other end user or location. Registration may be performed during a manufacturing process, before delivery of the camera device, on-site at the desired venue, or at another time or location. In some embodiments, registration may include connecting the camera device to a network, where it may be configured to automatically connect using its unique information.

In some embodiments, pre-registration may include entering identifying information for a camera device into a list of valid devices on a remote video server, such as during a manufacturing process. A later-performed registration process may be performed during an installation process, for example by an installing agent. For example, an installer may have a secure application, such as on a mobile device, requiring login information. The installer may use the secure application to scan a QR code, bar code, or similar data for the camera, which may be printed on packaging for the camera or on the camera itself. The QR code or similar data may contain unique information for the camera, such as a MAC address established during the initial registration process. The application can use this data to look up the camera in a database on a remote video server. The installer may also enter information on the venue, set up an administrator password, or other information.

As stated, the installer may enter information into the application which ties the camera to a venue, such as a venue name, address, owner name, or other data. The application can also be used to set up an account connected to the camera, for example using a venue administrator e-mail and password. The account may be used by a venue administrator to collect data from the camera or adjust settings for the camera. For example, a venue administrator may be able to log in to the remote video server using a computer application or website to view or change settings related to the camera.

Method 600 may include establishing a network connection for the camera device, at 604. For example, this may include connecting the camera device to a local router at a venue, using a wired or wireless connection. In some embodiments, the camera device may have a built-in router. The camera device may be capable of connecting to a network through other means, such as using satellite or cellular communication.

Establishing a network connection, at 604, may also include connecting to a server of the remove video system. For example, if the camera device was registered during manufacture or prior to delivery, the camera may "log in" to a remote video system server by providing its GUID, MAC address, a username and password, or any other information that may allow the server to recognize and verify the camera device. In some embodiments, the communications from the camera device may be encrypted or include authentication tokens.

Method 600 may include placing or installing the camera device at the desired location, at 606. For example, the camera device may be mounted to a wall or ceiling of a club, bar, or restaurant, placed at a customer service station of a store, placed into an ambulance or emergency vehicle, or any other desired location.

In some embodiments, the camera can be authenticated at a remote video server automatically and begin streaming data to a media server as soon as the camera is connected to a network, for example by connecting the camera to a router using a wired or wireless connection. Connecting to the remote video system may create or open a channel for data streaming, such as for video or audio data. The method 600 may include streaming data from the camera device for viewing, at 608. In some embodiments, a camera or remote video servers may have a manual approval process to verify that the camera has been properly set up and is streaming correctly prior to making the stream available to a user. In other embodiments, the stream may become automatically available as soon as it is connected to the network.

Transmitted data may be stored or re-broadcast from a server of the remote video system, where it may be accessed by users on various devices using web browsers or mobile applications. Data captured at the camera device may undergo processing or manipulation at the camera device prior to streaming, after receipt at one or more servers, or both. For example, the camera device may recognize people and apply a blurring effect to hide identities, and it may measure an activity level or number of people in the camera's view. The video feed with blurred faces and activity level information may be sent to a server of the remote video system, where additional processing may be performed. For example, the video from the camera may be combined with audio from another source based on selections by an administrator for the camera, and then streamed to end users. Other embodiments are also possible.

Data streamed from the camera may be accessed by users within minutes of connecting the camera to a network. For example, a user may be able to use a mobile device application, website, or similar service to look up popular video feeds, search for a specific venue, search for venues near to their location, or similar options. In some embodiments, a user may scan a QR code at a venue to be automatically connected to the stream for that venue, for example to allow a user to take photos of themselves or friends using the camera device.

It should be understood that the steps of FIG. 6 and other flowcharts herein may be performed in a different order than they are presented. For example, the camera device may be placed in a desired location, and then a network connection may be established.

Figure 7:
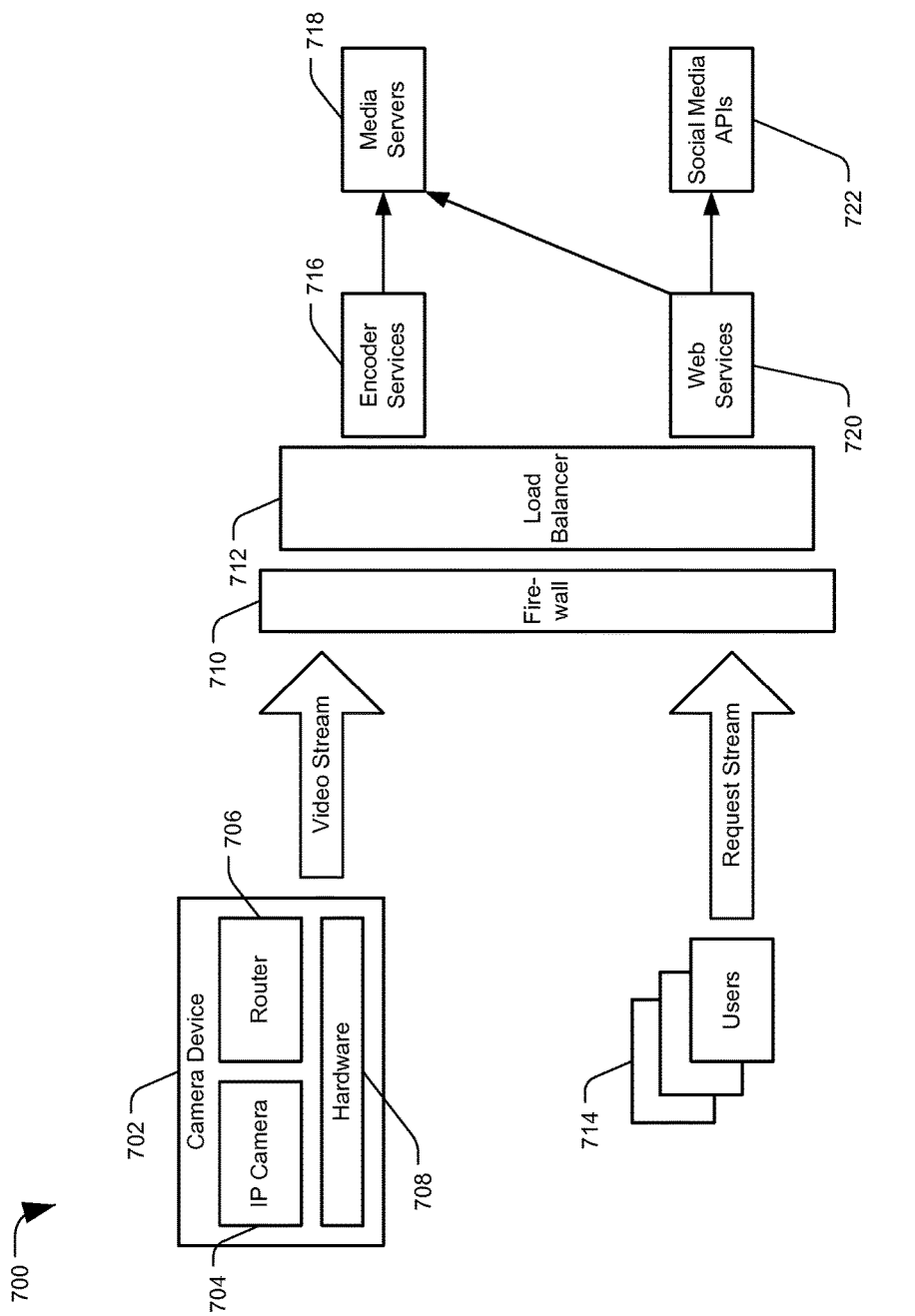
FIG. 7 depicts an example embodiment of a remote video system, in accordance with certain embodiments of the present disclosure.

FIG. 7 depicts an example embodiment of a remote video system 700, in accordance with certain embodiments of the present disclosure. In particular, system 700 may be an example embodiment of a remote video system for streaming video from a camera device set up at a particular venue or location.

System 700 may include a camera device 702, which may include an internet protocol (IP camera) or other camera element 704, a router 706, and additional hardware 708. In some embodiments, IP camera 704 may include a camera for obtaining image data and a microphone for capturing audio data. Router 706 may be internal or external, and may provide a method of connecting to a network for data streaming. In some embodiments, camera device 702 may include a wireless adapter, a cellular adapter, or other elements for connecting to a network or broadcasting a data or video stream. Hardware 708 may include one or more processors, controllers, memories, or other elements. Hardware 708 may include a memory storing instructions that, when executed by a processor, control the operation of camera device 702. For example, hardware 708 may control the camera 704 and router 706 elements. Hardware 708 may perform processing on captured data, such as by applying image filters or blurring effects. Hardware 708 may also obtain, store, and implement setting information from a remove video server, such as venue hours, image processing settings, or other information. Hardware 708 may convert captured video content to a desired format, and stream the data. Hardware 708 may handle conversions, encryption, or other data manipulation necessary for network communication or video streaming or presentation. Other embodiments are also possible.

Video may be streamed from camera device 702 to servers or computers of a remote video system. The camera may be configured to push video streams to specific locations or IP addresses, for example. In some embodiments, video streams may pass through or be routed by a firewall 710. A load balancer 712 may direct video streams and stream requests from users 714 to available computing resources, such as various media servers.

The remote video system servers and computing resources may include encoder services 716, such as to performing encoding functions and operations on incoming video streams. Encoded video streams may be sent to media servers 718, which may store, rebroadcast, or make available video streams from camera devices 702. The remote video system may also include a web services 720 module, which may handle communications between electronic devices over a network. For example, stream requests may be received by web services 720 from users 714, and requested streams may be obtained from media servers 718 and returned to the users 714. The remote video system may also include social media application programming interfaces (APIs) 722. For example, the social media APIs 722 may establish functionality and interoperability with social media websites and applications, which may allow streams and videos to be posted, linked, shared, or otherwise distributed on social media services.

Figure 8:
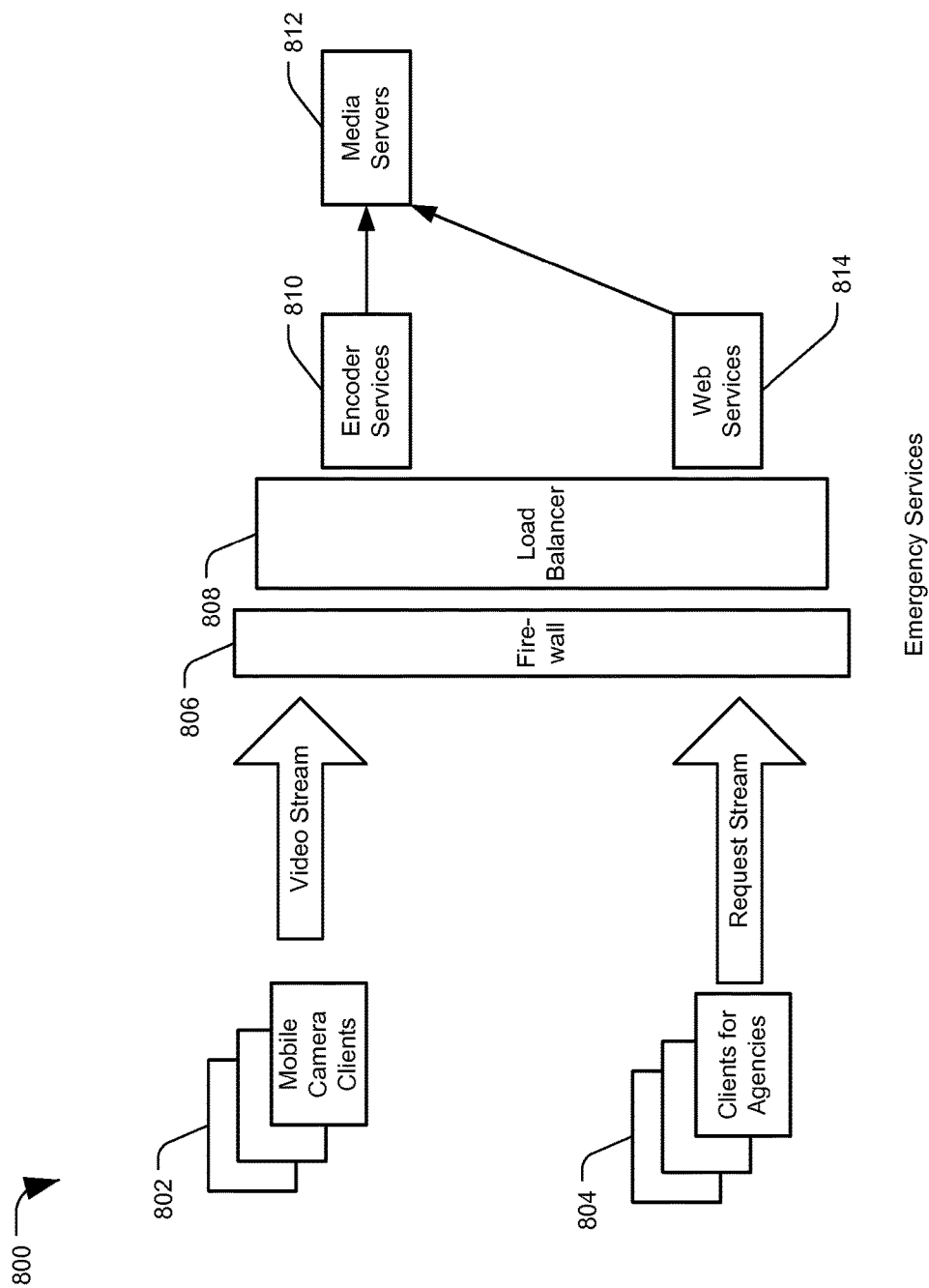
FIG. 8 depicts an example embodiment of a remote video system, in accordance with certain embodiments of the present disclosure.

FIG. 8 depicts an example embodiment of a remote video system 800, in accordance with certain embodiments of the present disclosure. In particular, system 800 may be an example embodiment of a remote video system for streaming videos for emergency services.

Every day there may be thousands of interactions between thousands of ambulances and emergency rooms. The operating procedure between ambulances and emergency rooms can be a chaotic system that employs a phone call from the ambulance to the ER informing the ER of what is en route to their facility. A lot of times information is lost in translation due to noise in the back of the ambulance, noise in the emergency room, interference or bad reception, or other reasons. In order for this call to take place a medic must stop or reduce care of the patient and make the call to the receiving hospital. Alternately, on some occasions the information is transferred to the driver of the ambulance and the driver makes the call, which can raise many other concerns. At the receiving hospital the doctor or nurse may then need to stop care and pick up the phone.

In some situations the call may be placed 5 minutes prior to the arrival of the ambulance to the ER. Information like chief complaint, pulse, respirations, blood pressure, etc. is relayed from the medic in the ambulance to the ER. The nurse or doctor may then reply with questions and assign a room number. Of course this isn't what always happens, and in fact chaos occurs as often as not. Another important point is that the only people who know what happens in the back of an ambulance are the medics and the patient. Many lawsuits come in every year from the back of the ambulance regarding what was or was not done.

A remote video system may be employed by emergency services to help mitigate communication errors and legal issues and, most importantly, save lives. A camera device in an ambulance may allow hospital personnel to see and evaluate a patient's condition without requiring attention from ambulance personnel, while minimizing errors in communication. For example, ambulance personnel may have a remote video application installed on a mobile device, allowing a camera of the mobile device to act as a remote camera and stream video content, where it can be viewed by hospital personnel. Audio input and speakers on the phone may allow ambulance personnel and hospital personnel to verbally communicate information in addition to the video stream. Doctors or other hospital personnel may be able to make real-time life-saving decisions based on the patient's condition from the video stream. The application may also allow ambulance personnel to enter relevant vital statistics or other information that may not be apparent from a video, such as pulse, temperature, respiration, etc. Similarly, a remote video system can be used in long distance transports and mass casualty incidents, giving the command and control a tool that helps direct ambulances where they need to go. In addition, a remote video system can mitigate legal risks by capturing an account of events in the ambulance.

Accordingly, system 800 may include one or more mobile camera clients 802. For example, one or more persons in each ambulance may have a device 802 configured for remote video streaming, such as a mobile phone, tablet, wearable computer, or other network-equipped camera device. This may include having an installed application to facilitate the functions of remote video streaming, and may be specially configured for emergency service video streaming, including inputs for vital data. Devices or applications for video streaming may have a secure connection to an emergency services video streaming portal, such as by using encryption and passwords to securely connect to a hospital video streaming server.

The video streaming system 800 may include a system of servers, processors, storage, and other computing devices for receiving video streams from mobile clients 802 and providing the streams to clients for emergency service agencies 804. For example, clients for agencies 804 may include hospitals or emergency rooms. For example, clients for agencies 804 may include computing devices running applications or accessing a website which allows the clients 804 to view video streams from the mobile clients 802, to receive information such as vital statistics, and to communicate with emergency personnel.

Video streams and stream requests may pass through or be routed by firewall 806. Video streams and stream requests may be routed by a load balancer 808 to available computing resources. Encoder services 810 may encode video streams received from mobile clients 802, for example into a format appropriate for broadcast and viewing. Media servers 812 may receive the encoded video stream data, and provide the stream data to clients for agencies 804 via a web services module 814. In some embodiments, clients for agencies 804 may need to log or otherwise be securely connected to the system, as access to video streams from emergency services may be strictly controlled.

Figure 9:
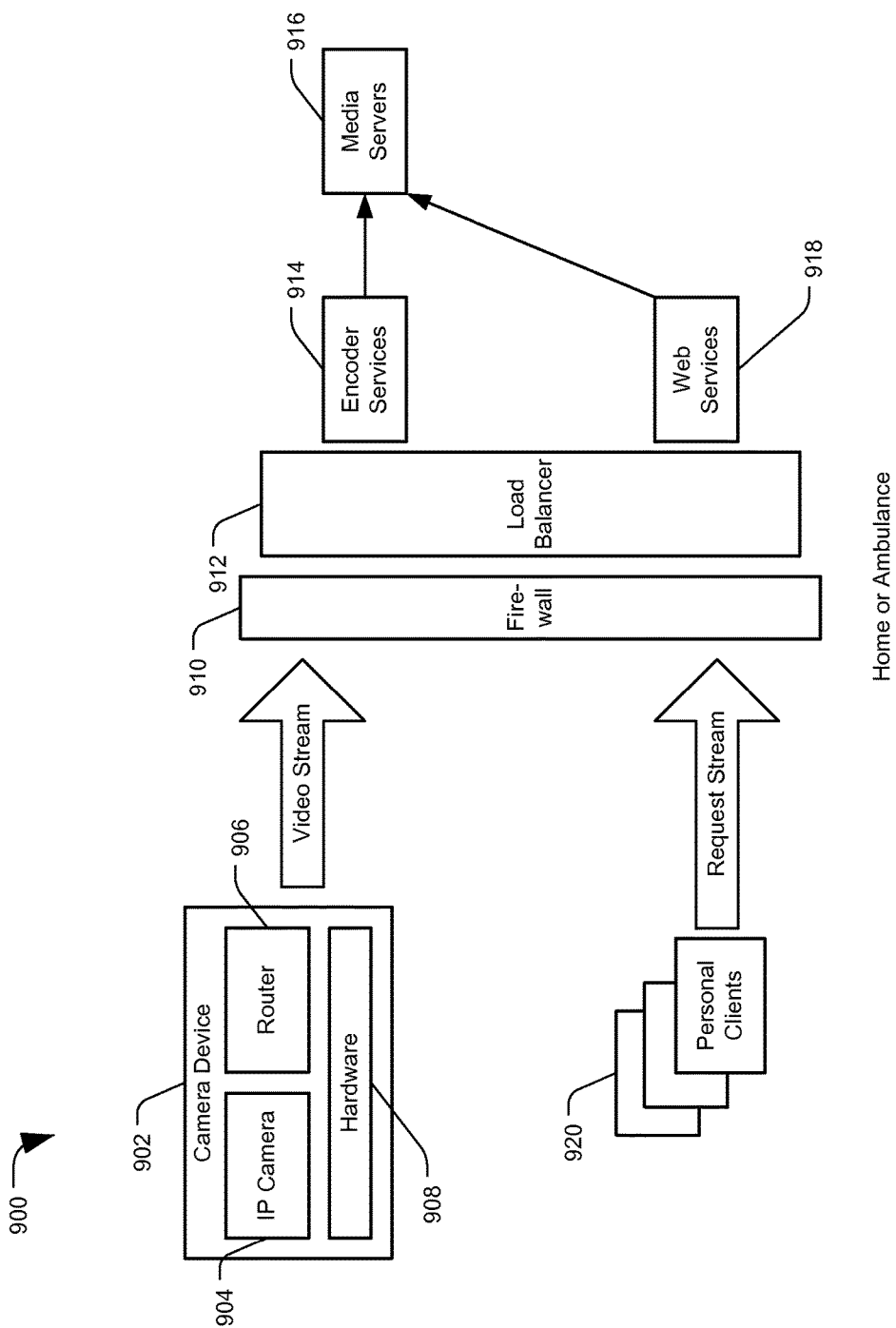
FIG. 9 depicts an example embodiment of a remote video system, in accordance with certain embodiments of the present disclosure.

FIG. 9 depicts an example embodiment of a remote video system 900, in accordance with certain embodiments of the present disclosure. In particular, system 900 may be an example embodiment of a remote video system for streaming private access videos, such as for personal home use or for emergency services.

System 900 may include a camera device 902, such as that described in relation to FIG. 7. For example, camera device 902 may include an IP camera or other video capture component 904, a router or other network access component 906, and hardware 908 to control functionality and processing of the camera device 902. Camera device 902 may be set up in a personal residence, office, nursery, school bus, ambulance, or other location that may not be intended for public or widespread viewing. The camera device 902 may establish a secure or private connection to a remote video system or servers, such as using encryption, authentication tokens or certificates, passwords, or other security measures.

As described in relation to FIGS. 7 and 8, video streams may be passed through a firewall 910 and load balancer 912, according to some embodiments. Videos or streams may be processed at encoder services 914, and directed to media servers 916. Personal clients 920 may access the remote video system through a web services module 918. For example, personal clients may be homeowners, parents, hospital personnel, or other persons having rights to access video streams from camera device 902. Personal clients 920 may log in to the remote video system through a secure portal, such as by providing a username and password to access an account having rights to particular remote video streams. Web services module 918 may process stream requests and obtain video streams via media servers 916.

Figure 10:
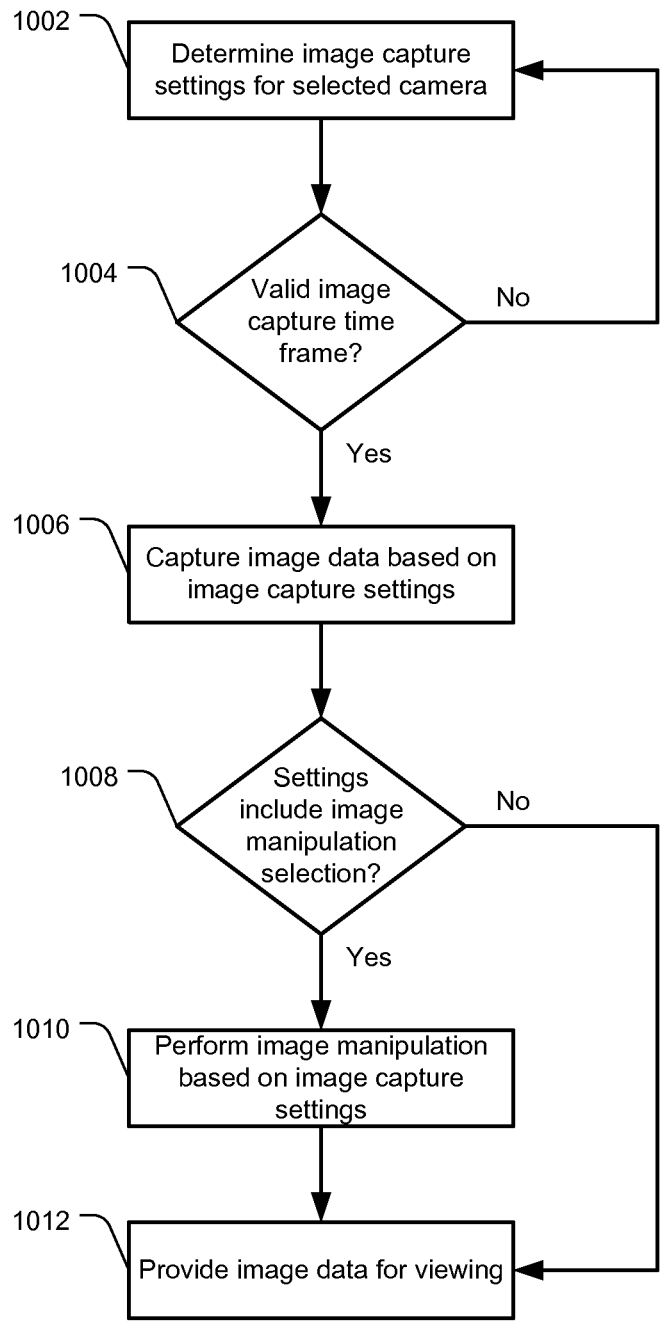
FIG. 10 is a flowchart of a method for a remote video system, in accordance with certain embodiments of the present disclosure.

FIG. 10 is a flowchart of a method 1000 for a remote video system, in accordance with certain embodiments of the present disclosure. Method 1000 may include determining image capture settings for a selected camera, at 1002. For example, a camera device may obtain settings stored in a memory of the camera device, or stored in a remote video or administrative server of the remote video system. For example, capture settings may include default settings for each camera, settings selected by a venue administrator or camera owner, other settings, or any combination thereof.

Method 1000 may include determining if a current time is within a valid image capture time frame. For example, the camera device may have an internal clock or calendar to track a time or date, or the camera device may obtain the time information from a server or other source over a network. The camera device may compare the current time, date, or both against settings of valid image capture times, such as the operating hours of a venue.

If the current time is not within a valid image capture time frame, at 1004, the method may include remaining in a standby mode and periodically checking image capture settings at 1002 or monitoring the time at 1004. If the current time is within a valid image capture time frame, at 1004, the method may include capturing image data based on the image capture settings, at 1006. For example, this may include capturing image data during venue operating hours, performing face recognition or head tracking, monitoring activity levels, or other image capture settings.

The method 1000 may include determining whether the image capture settings include one or more image manipulation selections, at 1008. For example, image manipulation may include applying blurring filters over detected faces or customers, applying a cartoonization filter, applying other graphical overlays or filters, or otherwise manipulating the captured image data. If no image manipulation features are selected, at 1008, the method may include providing the unaltered image data for viewing, at 1012. For example, the video stream may be provided to a remote video server, a media server, or other parts of a remote video system. If image manipulation features are selected, at 1008, the method may include performing the selected image manipulation based on the image capture settings, at 1010. After performing image manipulation, at 1010, the method may include providing the modified image data for viewing, at 1012.

While method 1000 may be performed by a camera device as described herein, in some embodiments method 1000 may be performed by another computer or server in the remote video system, or by a combination of components. Other embodiments are also possible.

Figure 11:
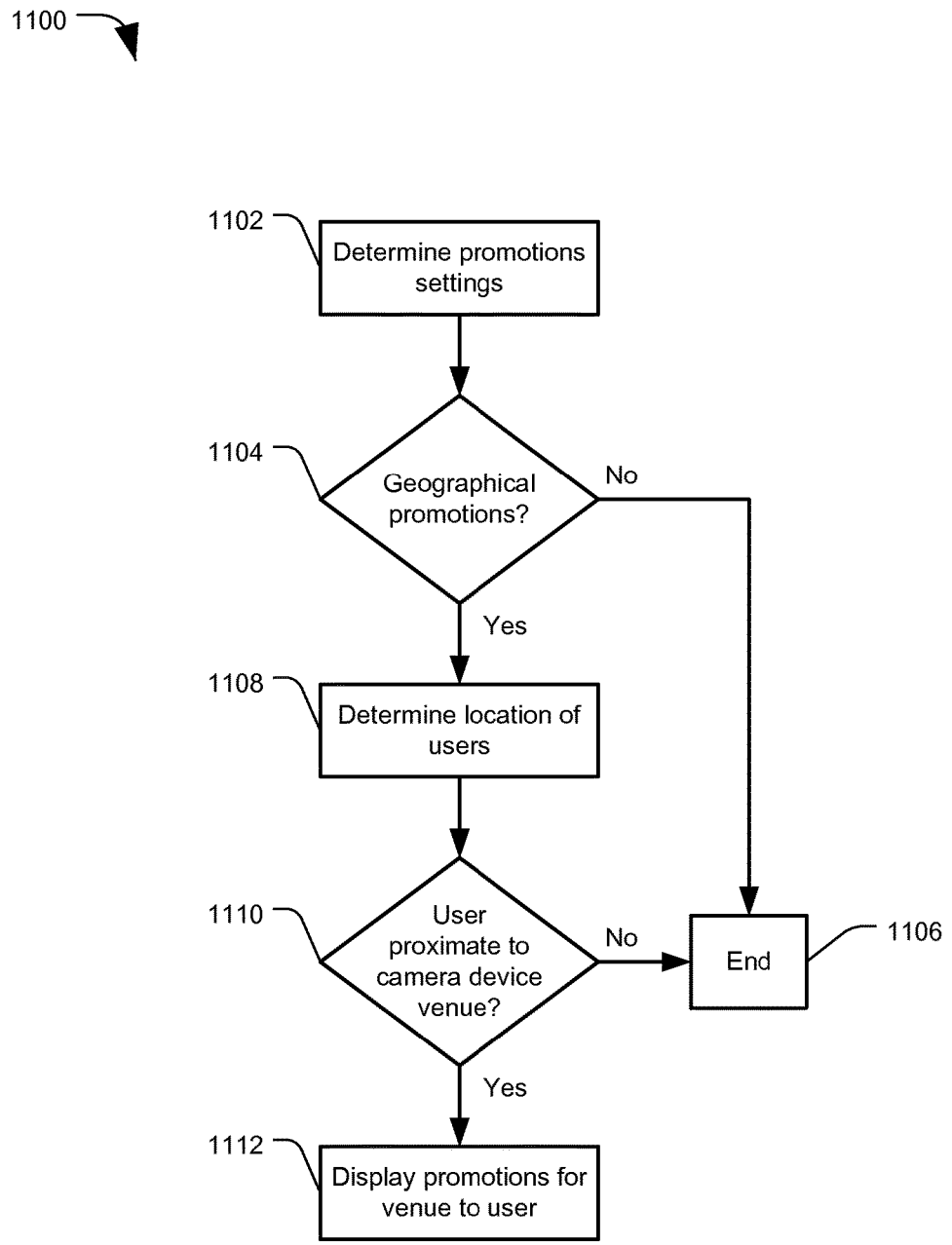
FIG. 11 is a flowchart of a method for a remote video system, in accordance with certain embodiments of the present disclosure.

FIG. 11 is a flowchart of a method 1100 for a remote video system, in accordance with certain embodiments of the present disclosure. Method 1100 may be performed by a camera device located at a particular venue. In some embodiments, method 1100 may be performed by a video server remotely located from a camera device or the associated venue, or method 1100 may be performed by a combination of computer systems.

Method 1100 may include determining promotions settings, at 1102. For example, a venue administrator may select promotions settings for video streams from one or more camera devices located at the venue. Selections and settings may be stored on a remote video server or on a camera device at the venue. Promotions may include advertisements, coupons, sales, or other offers or enticements that may be displayed to potential customers or viewers of video streams from the venue.

Method 1100 may include determining if geographical promotions are selected, at 1104. Geographical promotions may include promotions targeted at potential customers based on geographical location. For example, promotions may be broadcast or displayed to users or viewers within a certain geographical proximity to the venue, within a specified town or zip code, or based on other criteria. In some embodiments, a first set of advertisements or promotions may be available for offer to all users regardless of geographical location, while a second set of promotions may be displayed to customers within a geographical proximity.

If geographical promotions are not selected, at 1104, the method 1100 may end, at 1106. In some embodiments, geographical promotions not being selected may mean that advertisements are broadcast to all users or stream viewers regardless of their geographical location. If geographical promotions are selected, at 1104, the method 1100 may include determining a location of users, at 1108. For example, an application on a user's mobile device may access global positioning system (GPS) functionality to determine a user's approximate location, in response to a query from a remove video server. In some embodiments, a user's IP address, cellular tower, or other information may be used to determine an approximate location of the user. Other embodiments are also possible.

The method 1100 may include determining if the user is proximate to the camera device venue, at 1110. For example, if the user's approximate location, as determined at 1108, is within three miles of the venue, or is within the same city or zip code as the venue, or otherwise within a defined threshold proximity, the user may be determined to be "proximate" to the venue. If the user is not proximate to the venue, at 1110, the method may end, at 1106. If the user is determined to be proximate to the venue, the method may include displaying promotions for the venue to the user, at 1112. For example, particular advertisements calculated to bring in foot traffic, such as limited-time offer coupons, may be displayed to proximate users. Other embodiments are also possible.

Figure 12:
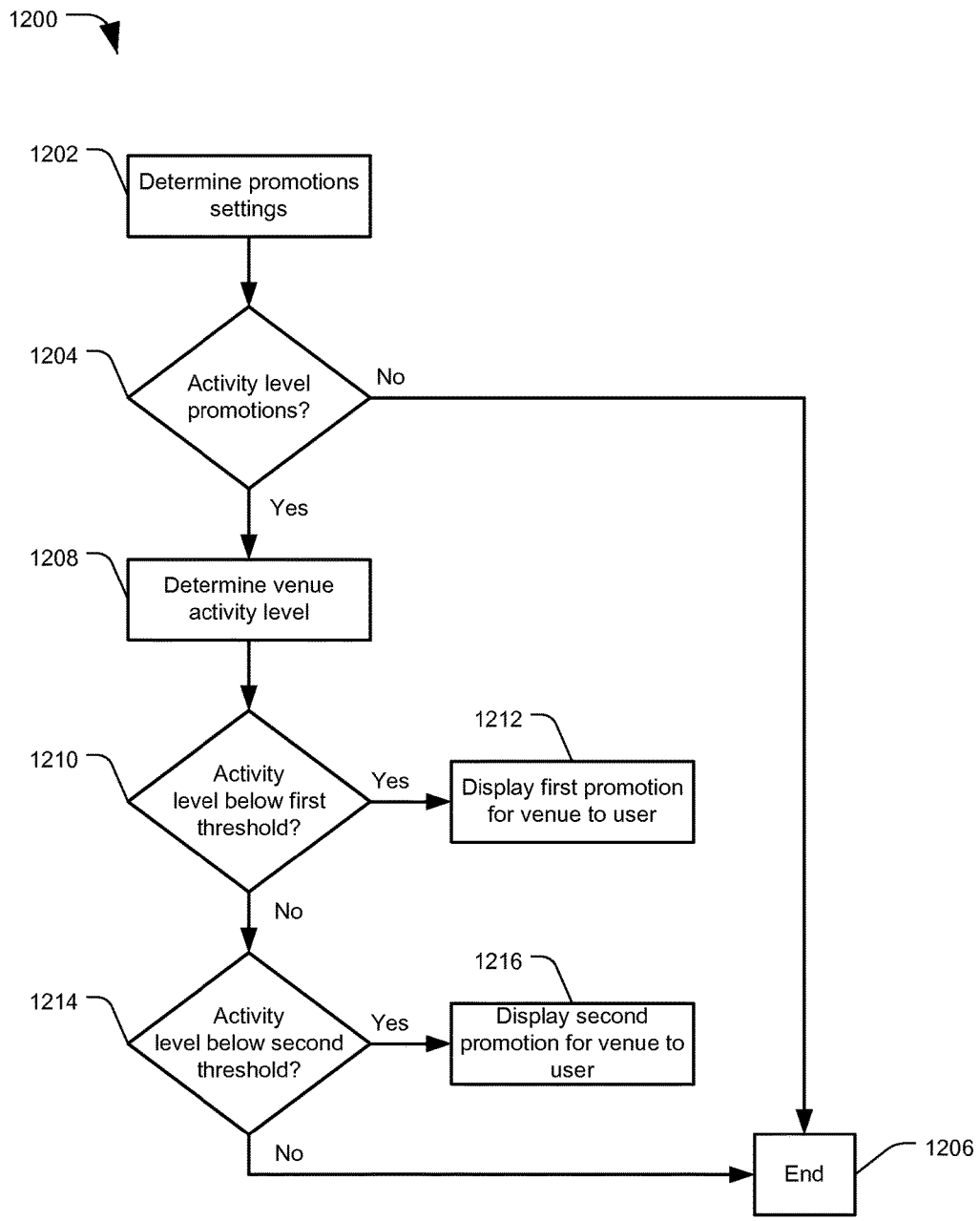
FIG. 12 is a flowchart of a method for a remote video system, in accordance with certain embodiments of the present disclosure.

FIG. 12 is a flowchart of a method 1200 for a remote video system, in accordance with certain embodiments of the present disclosure. Method 1200 may be performed by a camera device located at a particular venue. In some embodiments, method 1200 may be performed by a video server remotely located from a camera device or the associated venue, or method 1200 may be performed by a combination of computer systems.

Method 1200 may include determining promotions settings, at 1202. The promotions settings may be settings for advertisements, coupons, or other promotions as discussed in relation to FIG. 11. The method may include determining if activity level promotions are selected, at 1204. Activity level promotions may be selected promotions for display to customers based on a measured activity level within a venue. For example, a camera device at a venue may be configured to measure an amount of activity within a venue based on a volume of measured sound, based on a quantity of changing pixels within an image frame over a period of time, based on a number of customers within an image frame based on image recognition routines, based on other measurements or metrics, or any combination thereof. If the activity level is below a certain threshold, above a certain threshold, or otherwise meets selected criteria, selected promotions may be displayed to viewers of streams from the camera device or users of a remote video streaming application or website. In some embodiments, different selected promotions may be offered based on multiple activity level thresholds. Other embodiments are also possible.

If activity level promotions are not selected, at 1204, the method may end, at 1206. In some embodiments, advertisements may still be displayed to users even if those promotions are not based on activity levels. If activity level promotions are selected, at 1204, the method may include determining a venue activity level, at 1208. This may include evaluating image or audio data captured at a camera device for activity levels, as described herein.

The determined venue activity level may be compared against a first threshold, at 1210, to see if the activity level is below a threshold. For example, if a restaurant is determined to be below fifty percent venue capacity based on a number of customers in the view, the activity level may be below the first threshold. In some embodiments, an activity level may be compared to see if it is higher than a threshold. For example, a club or bar may display special advertisements to customers when the venue is above a threshold, to promote the venue as a popular location. In some embodiments, a viewer of a very busy venue may be offered a "rain check" coupon to encourage them to visit the store when it is less busy.

If the activity level is below the first threshold, at 1210, the method may include displaying a first promotion for the venue to users, at 1212. For example, if a restaurant is below a twenty percent capacity threshold, a coupon for five dollars off an entrée may be provided to remote streaming users to attract additional customers.

If the activity level is not below the first threshold, at 1210, the method may include determining if the activity level is below a second threshold, at 1214. For example, the first threshold may be for twenty percent capacity, while the second threshold may be for fifty percent capacity. If the activity level is below the second threshold, at 1214, the method may include displaying a second promotion for the venue to users, at 1216. For example, if a restaurant is above twenty percent capacity but below fifty percent capacity, a second smaller coupon may be offered to potential customers, such as two dollars off an entrée. If the activity level is not below the first threshold or the second threshold, the method may end without providing any activity level-based promotions, at 1206. While two activity level thresholds are described, in some embodiments more or fewer thresholds may be employed.

In some embodiments, multiple promotion settings may be combined or selected. For example, a venue administrator may select both activity-level promotions, as described in regards to FIG. 12, and geographical-based promotions as described in regards to FIG. 11. In certain embodiments, a camera device or remote video server may then determine if an activity level is below a threshold, and if so, only provide special promotions to users within a certain geographical proximity to the venue. Other embodiments are also possible.

Figure 13:
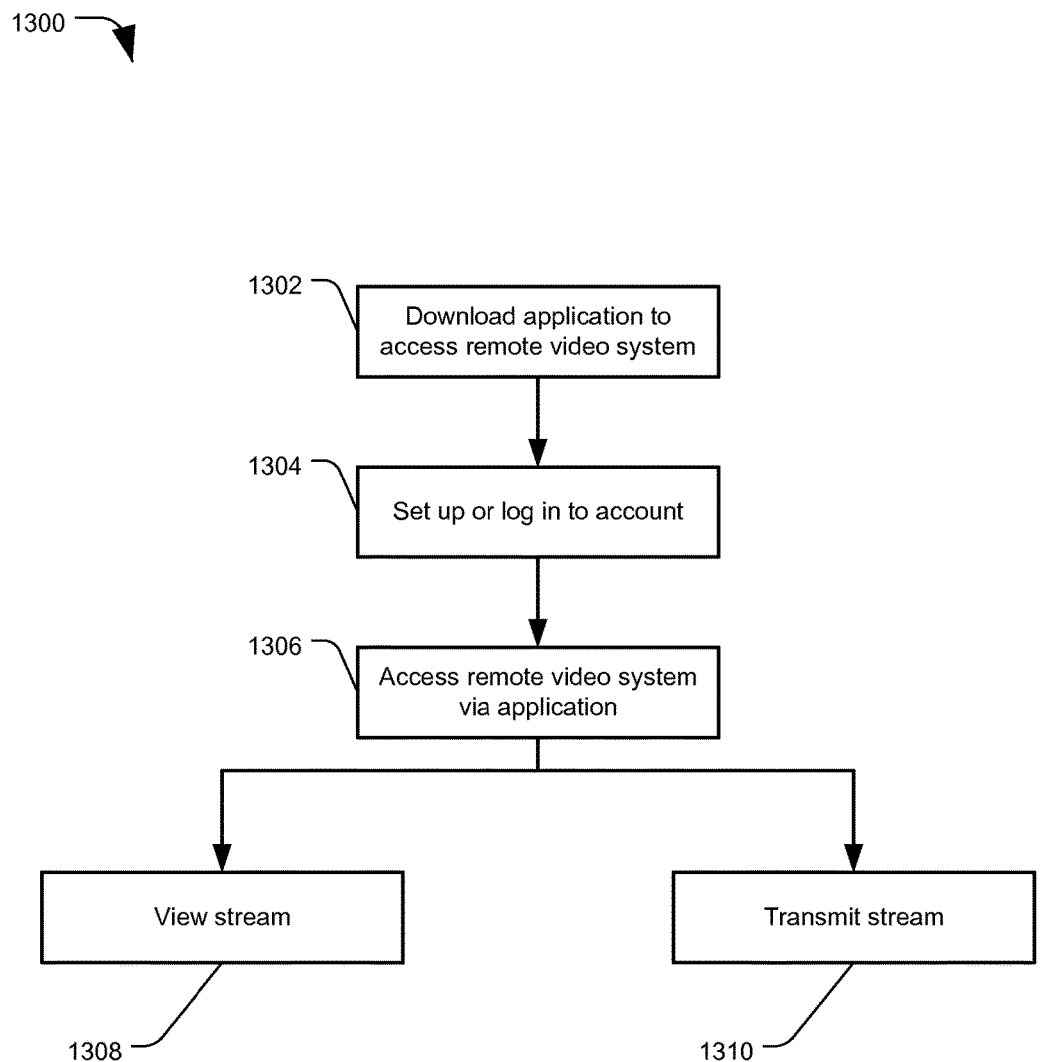
FIG. 13 is a flowchart of a method for a remote video system, in accordance with certain embodiments of the present disclosure.

FIG. 13 is a flowchart of a method 1300 for a remote video system, in accordance with certain embodiments of the present disclosure. In particular, method 1300 presents a method for users to access a remote video system, according to some embodiments.

A user may download an application or program to access the remove video system, at 1302. For example, a user may download and install an app on a phone or tablet device, on a personal computer, or on another device connected to a network. In some embodiments, a user may navigate to a website featuring streaming content from the remote video system without the need to download a specific application. Accessing the remote video system may include connecting to media servers which can stream media content to users through an application or website.

Method 1300 may optionally include a user signing up for an account at 1304, such as signing up for a premium or paid account. In other embodiments, an account may be created to allow a user to access a personal video feed, such as from a camera set up in the user's home. In such instances, a user may provide identifying information, such as a user name and password, through the application or website to log in.

A user may access the remote video system via the application or website, at 1306. A user may be provided with a graphical interface via the application or website through which the user may access content. The interface may provide a list of suggested feeds. For example, a user or the user's device may provide a user's location to a remote video server, and the application may be provided with a list of feeds from nearby venues. The application may suggest venues based on a user's history of media accesses, for example by suggesting similar venues. In some embodiments, a user may be able to search for a particular video stream by venue name, location, venue type, or similar information. In an example embodiment, the media options available to a user may depend on whether the user has a normal account or a premium account. For example, a user may set up a camera in their home, which can only be accessed by users logged in with a specific username and password. In another example embodiment, a camera may be set up in a school bus, and only parents may log in and view the streamed content.

Based on a user's media selection, media content may be transmitted to the user device from the media server. For example, the user may view a stream from a selected venue, at 1308. The media stream may have been manipulated, such as with video manipulation, at the point of the camera or at the server. The length of time a user may view a media stream, and how often a stream from the venue can be viewed, may depend on the type of user account, on settings established by venue administrators, or on other settings. For example, a server may provide a stream from a venue for five seconds, based on settings for the venue. After the five second stream, a user may have to wait for five minutes before they can view a stream from that venue again.

In some embodiments, a user may be able to use the application to capture a photo from a specified camera. For example, a user could gather friends to stand in front of a camera, then select an option to take a picture. The signal may be transmitted to the camera through the server, causing an indicator light on the camera to blink prior to a picture being taken, for example. The picture may be captured by the camera itself and transmitted to the user's device through a server, or the user's application may capture a picture of the video feed at the user device.

A user may also be able to transmit data from the user device to the server. In some embodiments, an application downloaded by the user can allow the user device to function as a camera device of the remote video system. For example, a user may use a camera connected to their device to capture images or video which can be transmitted to the server, at 1310, and which can in turn be accessed by other users. For example, if a user has a specific emergency medical personnel version of a remote video application, their captured video content may be viewable by a designated hospital. The application may be configured to encrypt content prior to transmitting it to the server.

In some embodiments, a user's device may simultaneously function as a stream transmitter and a stream receiver. For example, a user may connect to a customer service video stream at a store, which may allow the user to see and hear a customer service representative of the store. The customer, through the application, may provide an audio stream, video stream, or both from their device to the customer service representative. This two-way stream may allow a customer on a mobile phone to ask where to find a particular product, and the customer service representative may be able to see the customer's location and direct them to the requested product. Other embodiments are also possible.

Figure 14:
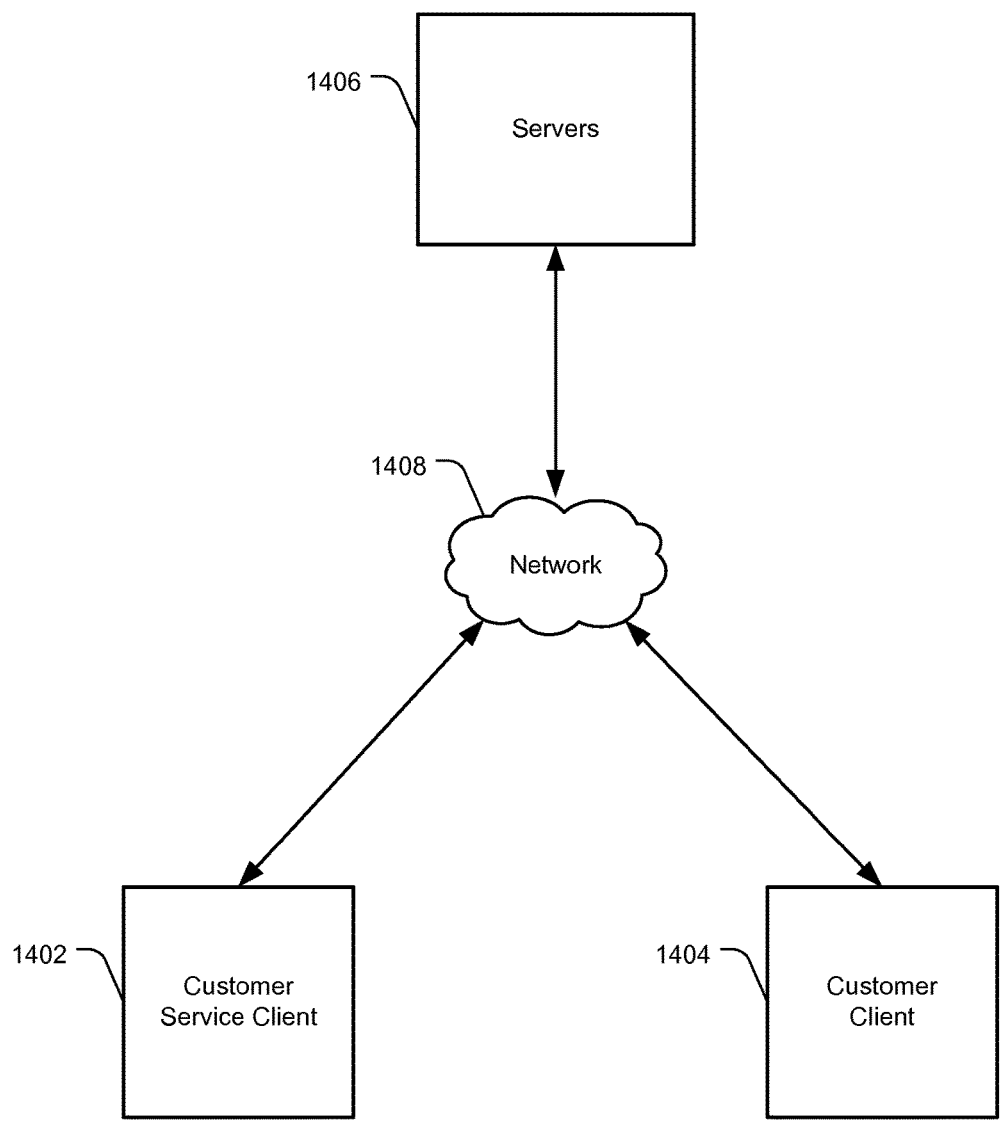
FIG. 14 depicts an example embodiment of a remote video system, in accordance with certain embodiments of the present disclosure.

FIG. 14 depicts an example embodiment of a remote video system 1400, in accordance with certain embodiments of the present disclosure. In particular, system 1400 depicts a means for two-way streaming for customer service, as described herein. System 1400 may include a customer service client 1402, a customer client 1404, and one or more servers 1406, all of which may be connected by way of network 1408.

Customer service client 1402 and customer client 1404 may include camera devices to capture video, audio, or both, displays to display image feeds or audio feeds, and a device to operate the camera device, the display, and to communicate with the network. In some example embodiments, customer service client 1402 may include a desktop or laptop computer with web camera functionality, a microphone, and speakers. Customer service client 1402 may be connected to network 1408 via wired or wireless internet connections, such as through an Ethernet cable connected to a router. Customer client 1404 may include a smart phone having a camera, and which may connect to network 1408 via a mobile telecommunications technology such as 4G or 5G. Servers 1406 may include one or more computers and memory devices which may receive data streams, encode or process the streams for storage or transmission, and broadcast the streams to other users.

In an example embodiment, a customer uses the customer client 1404 to locate a customer service feed for a store in which the customer is shopping. The customer may use an application on their phone to locate and connect to the stream. By connecting to the stream, a customer service video feed transmitted from customer service client 1402 to servers 1406 may be established and connected to customer client 1404, allowing the customer to see and communicate with a service representative. The customer client 1404 may also capture a video feed, audio feed, or both from the customer, and transmit it to the servers 1406. The customer client feed may then be sent to the customer service client 1402, which may allow service representatives to see and speak with the customer. In this way, a customer may receive personal assistance without the need to locate a representative in the store, and customer service representatives may efficiently respond to customer needs.

Similar embodiments are also possible. For example, a restaurant or grocery store may stream a cooking show, which may be viewed by customers of the restaurant or store, or users at home or elsewhere. The host of the show may also be connected to feeds from viewers, to respond to questions or suggestions. Other embodiments may include business training workshops, classes, or other interactive presentations. A customer at home performing a do-it-yourself project may be able to contact a building specialist at a hardware store to ask questions or see a technique demonstrated. Streams may be stored on media servers and available to users at a later time or on-demand.

Cameras may be strategically placed for achieving a desired purpose. For example, a camera may be focused on a shelving end-cap to highlight a particular product. Distributers may pay a store for the right to have their product displayed within the camera view as a form of advertising. By placing a camera device in a store or at a parking lot, customers may determine where and when to visit the store, effectively smoothing customer volume and efficiently allocating store resources. A camera device may be set up at a farm or pasture, to show customers how livestock for the venue is treated and maintained.

In some embodiments, customers may use a remote video application to "check in" at a store or venue, or the application may monitor position data (e.g. using GPS) to tally when the customer enters a remote video-enabled venue. This may allow venue administrators to gauge customer activity and promotional success. For example, the application may measure a time between when a user viewed a stream or received a promotion from a venue and when the customer arrived at the venue. A venue administrator may be able to see, e.g. via an administrative user interface (UI) panel, how many users have viewed a stream from the venue, received promotions, and visited the venue.

Different venues may establish their own remote viewing mobile applications or web interfaces to maintain corporate branding. Alternately, a single mobile application may be used for multiple venues, but the user interface may be modified based on the venue to give each stream page a unique feel that matches the venue. Venues may have stored videos, images, or other content in addition to live streams. For example, a store may have a store map or tour available to users of a live streaming application.

Camera devices of the remote video system may be configured to push video streams to servers, rather than having the servers pull information from the cameras. "Push" may refer to a style of internet communication in which the request for a data transaction is initiated by the publisher or data-providing entity, as contrasted with "pull", where the request for a transmission is initiated by the receiver or client. In this case, the camera may provide the data of the transmission, and may initiate the transmission rather without first receiving a request from a receiver server or client. The camera devices may include processors and firmware configured to provide a variety of content modification functionality at the camera itself, such as image and audio manipulation and editing. For example, a restaurant having a horse mascot may configure the camera device to superimpose horse heads on customers in the video stream, simultaneously keeping customer identities private and promoting the restaurant's brand.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
   a video capture device including a processor configured to couple to a camera and a network interface, the processor configured to:
      when a current time is within a valid time frame, capture video data based on capture settings including:
         receive near real-time image data from the camera;
         graphically modify the near real-time image data to generate modified near real-time image data, including:
            perform image analysis to detect one or more humans in the near real-time image data;
            graphically modify the near real-time image data by obscuring at least a part of a visual image of a detected human in the near real-time image data;
         push the modified near real-time image data as a streaming video to a remote server via the network interface without receiving a request from the remote server for the modified near real-time image data;
when the current time is not within the valid time frame, remain in a standby mode and periodically monitor the current time;
only permit the video capture device to transmit the modified near real-time image data and not transmit raw image data to the remote server;
the remote server including a network interface and memory, the remote server configured to:
receive the streaming video of the modified near real-time image data from the video capture device;
store the streaming video to the memory;
upon request of a user, provide a first portion of the streaming video to a remote viewing device of the user, the first portion including a first amount of the streaming video for a limited duration that is relatively short compared to the valid time frame, thereby allowing the user to view near real-time video;
disable access of the remote viewing device to the streaming video for a time-out period following delivery of the first portion to the remote viewing device, where during the time-out period, the user cannot view any portion of the streaming video; and
re-enable access to the streaming video for the remote viewing device after the time-out period has elapsed.

2. The device of claim 1, further comprising the processor is internally located in a video camera housing the camera and the network interface.

3. The device of claim 1, further comprising the processor configured to:
retrieve operating hours for a venue to which the device is associated from the remote server and utilize the operating hours as the valid time frame; and
the processor is further configured to operate the camera to capture image data and push the modified image data based on the operating hours.

4. The device of claim 1, further comprising the processor configured to:
retrieve indications of graphic filters to be applied to the image data from the remote server; and
the processor configured to graphically modify the image data based on the indications.

5. The device of claim 1 comprising the processor further configured to transmit a count of detected humans to the remote server.

6. The device of claim 1 comprising the processor further configured to graphically modify the image data by blurring at least a part of a face of a detected human in the image data.

7. The device of claim 1 comprising the processor further configured to graphically modify the image data by applying a cartoonization filter to at least a part of the image data.

8. The device of claim 1 further comprising:
the processor further configured to:
determine an activity level value for a venue to which the device is associated based on detected movement in the image data;
provide the activity level value to the remote server via the network interface;
the remote server configured to:
determine if the activity level of a venue is below a threshold; and
when the activity level is below the threshold, initiate an advertisement to display on the remote viewing device.

9. The device of claim 1 further comprising:
the video capture device further including:
a flash lighting element; and
the processor further configured to:
receive a notification to take a picture based on an indication initiated by the user via the remote viewing device; and
activate the flash lighting element and initiate the camera to take a picture based on the notification.

10. An apparatus comprising:
a network interface;
a processor coupled to the network interface and configured to:
maintain camera settings for operation of a remote camera device;
receive, via the network interface, streaming video data pushed from the remote camera device as near real-time video including image data of a human that has at least a part of a visual image of the human obscured;
upon request of a user, provide a first portion of the near real-time video to a remote viewing device, the first portion including a first amount of a video having a limited duration that is relatively short compared to a length of the streaming video;
disable access of the remote viewing device to the video data for a pre-defined period of time following delivery of the first portion, where during the period of time, the user cannot view the streaming video;
automatically re-enable access to allow the user to view the streaming video at the remote viewing device after the pre-defined period of time has elapsed;
receive, from the remote camera device, data on an activity level of a venue the remote camera device is associated with;
compare the activity level to a threshold; and
provide promotions to the remote viewing device when the activity level is below the threshold.

11. The apparatus of claim 10 comprising the processor further configured to receive the camera settings set by an administrator of a venue with which the camera device is associated.

12. The apparatus of claim 11 further comprising the camera settings include an image capture time frame selection indicating operating times for the remote camera device, an image manipulation selection indicating graphical image manipulations for the remote camera device to perform on the image data, and a promotions selection indicating preferences for promotions provided to remote viewing devices.

13. The apparatus of claim 10 comprising the processor further configured to:
receive geographical data from the remote viewing device; and
provide promotions to the remote viewing device based on a geographical proximity of the remote viewing device in relation to a venue the remote camera device is associated with.

14. The apparatus of claim 10 wherein the limited duration is multiples of seconds, the pre-defined period of time is multiples of minutes, and the streaming video is a live video stream.

15. The apparatus of claim 14 wherein the limited duration is five seconds and the pre-defined period of time is ten minutes.

16. A memory device including instructions that when executed cause a processor to perform a method including:

receive streaming video data from a remote video camera located at a venue, the streaming data including near real-time video that has been modified to blur at least a part of a human in the streaming data;

upon request of a user, provide a first portion of the streaming video data to a remote viewing device, the first portion including a first amount of a video having a limited duration that is relatively short compared to a total time period of the streaming video data;

disable access of the remote viewing device to the streaming video data for a pre-defined period of time following delivery of the first portion, where during the period of time, the user cannot access the streaming video data; and automatically re-enable access to the streaming video at the remote viewing device after the pre-defined period of time has elapsed;

receive activity level information determined by the remote video camera;

determine if an activity level of the venue is below a threshold based on the activity level information; and when the activity level is below the threshold, initiate an advertisement to display on the remote viewing device.

17. The memory device of claim 16 further including instructions that when executed cause the processor to perform a method including:

determining if geographical promotions are selected;

when the geographical promotions are selected, sending the advertisement to user devices with a certain geographical proximity to the venue; and when the geographical promotions are not selected, sending the advertisement to all user devices regardless of their geographical location.

* * * * *